US012718429B2

(12) United States Patent
Jain et al.

(10) Patent No.: US 12,718,429 B2
(45) Date of Patent: Aug. 25, 2026

(54) DIGITAL IMAGE REPOSING BASED ON MULTIPLE INPUT VIEWS

(71) Applicant: Adobe Inc., San Jose, CA (US)

(72) Inventors: Rishabh Jain, Gurgaon (IN); Mayur Hemani, Noida (IN); Mausoom Sarkar, Noida (IN); Krishna Kumar Singh, San Jose, CA (US); Jingwan Lu, Sunnyvale, CA (US); Duygu Ceylan Aksit, London (GB); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 479 days.

(21) Appl. No.: 18/215,484

(22) Filed: Jun. 28, 2023

(65) Prior Publication Data

US 2025/0005812 A1 Jan. 2, 2025

(51) Int. Cl.
*G06T 11/10* (2026.01)
*G06T 7/12* (2017.01)
*G06T 7/70* (2017.01)

(52) U.S. Cl.
CPC ................ *G06T 11/10* (2026.01); *G06T 7/12* (2017.01); *G06T 7/70* (2017.01); *G06T 2207/20081* (2013.01); *G06T 2207/30196* (2013.01); *G06T 2210/16* (2013.01)

(58) Field of Classification Search
None
See application file for complete search history.

(56) References Cited

U.S. PATENT DOCUMENTS

| | | | | |
|---|---|---|---|---|
| 11,024,060 | B1 * | 6/2021 | Ma | G06T 11/00 |
| 2024/0428564 | A1 | 12/2024 | Jain et al. | |
| 2025/0181787 | A1 * | 6/2025 | Alimo | G01S 17/86 |

FOREIGN PATENT DOCUMENTS

| | | | |
|---|---|---|---|
| CN | 113033334 A * | 6/2021 | G06N 3/045 |

OTHER PUBLICATIONS

Grigorev, A.—"Coordinate-based Texture Inpainting for Pose-Guided Human Image Generation"—arXiv—Jul. 2019—pp. 1-10 (Year: 2019).*

"Restriction Requirement", U.S. Appl. No. 18/213,118, Jul. 10, 2025, 5 pages.

(Continued)

*Primary Examiner* — Bernard Krasnic
(74) *Attorney, Agent, or Firm* — FIG. 1 Patents

(57) ABSTRACT

In implementations of systems for human reposing based on multiple input views, a computing device implements a reposing system to receive input data describing: input digital images; pluralities of keypoints corresponding to the input digital images, the pluralities of keypoints representing poses of a person depicted in the input digital images; and a plurality of keypoints representing a target pose. The reposing system generates selection masks corresponding to the input digital images by processing the input data using a machine learning model. The selection masks represent likelihoods of spatial correspondence between pixels of an output digital image and portions of the input digital images. The reposing system generates the output digital image depicting the person in the target pose for display in a user interface based on the selection masks and the input data.

19 Claims, 13 Drawing Sheets
(7 of 13 Drawing Sheet(s) Filed in Color)

(56) References Cited

OTHER PUBLICATIONS

"Coco Keypoint Evaluation", COCO Common Objects in Context [retrieved Feb. 19, 2023]. Retrieved from the Internet <https://cocodataset.org/#keypoints-eval>., 5 Pages.

Albahar, Badour et al., "Pose with Style: Detail-Preserving Pose-Guided Image Synthesis with Conditional StyleGAN", Cornell University arXiv, arXiv.org [retrieved Aug. 9, 2023]. Retrieved from the Internet <https://arxiv.org/pdf/2109.06166.pdf>., Aug. 10, 2022, 11 Pages.

Balakrishnan, Guha et al., "Synthesizing Images of Humans in Unseen Poses", Cornell University arXiv, arXiv.org [retrieved Feb. 19, 2023]. Retrieved from the Internet <https://arxiv.org/pdf/1804.07739.pdf>., Apr. 20, 2018, 9 Pages.

Cao, Zhe et al., "OpenPose: Realtime Multi-Person 2D Pose Estimation using Part Affinity Fields", Cornell University, arXiv Preprint, arXiv.org [retrieved Feb. 19, 2023]. Retrieved from the Internet <https://arxiv.org/pdf/1812.08008>., Dec. 18, 2018, 14 pages.

Chen, Yang et al., "Mocycle-GAN: Unpaired Video-to-Video Translation*", Cornell University arXiv, arXiv.org [retrieved Feb. 19, 2023]. Retrieved from the Internet <https://arxiv.org/pdf/1908.09514.pdf>., Aug. 26, 2019, 9 Pages.

Chopra, Ayush et al., "ZFlow: Gated Appearance Flow-Based Virtual Try-On With 3D Priors", Cornell University, arXiv Preprint, arxiv.org [retrieved Feb. 19, 2023]. Retrieved from the Internet <https://arxiv.org/pdf/2109.07001.pdf>., Sep. 2021, 10 Pages.

Cui, Aiyu et al., "Dressing in Order: Recurrent Person Image Generation for Pose Transfer, Virtual Try-on and Outfit Editing", Cornell University arXiv, arXiv.org [retrieved Feb. 19, 2023]. Retrieved from the Internet <https://arxiv.org/pdf/2104.07021.pdf>., Oct. 18, 2022, 19 Pages.

Cui, Aiyu et al., "Dressing-in-order", GitHub, Inc. [retrieved Feb. 19, 2023]. Retrieved from the Internet <https://github.com/cuiaiyu/dressing-in-order>., 2021, 5 Pages.

Dong, Haoye et al., "Soft-Gated Warping-GAN for Pose-Guided Person Image Synthesis", Cornell University arXiv, arXiv.org [retrieved Feb. 19, 2023]. Retrieved from the Internet <https://arxiv.org/pdf/1810.11610.pdf>., Jan. 11, 2019, 17 Pages.

Gafni, Guy et al., "Dynamic Neural Radiance Fields for Monocular 4D Facial Avatar Reconstruction", Cornell University arXiv, arXiv.org [retrieved Feb. 19, 2023]. Retrieved from the Internet <https://arxiv.org/pdf/2012.03065.pdf>., Dec. 5, 2020, 11 Pages.

Gatys, Leon A. et al., "Image Style Transfer Using Convolutional Neural Networks", In Proc. CVPR, 2016. [retrieved Jun. 28, 2023]. Retrieved from the Internet <https://rn-unison.github.io/articulos/style_transfer.pdf>., Jun. 2016, 10 Pages.

Güler, Riza A. et al., "DensePose: Dense Human Pose Estimation in the Wild", Cornell University, arXiv Preprint, arxiv.org [retrieved Mar. 9, 2023]. Retrieved from the Internet <https://arxiv.org/pdf/1802.00434.pdf>., Feb. 2018, 12 Pages.

Han, Xintong et al., "ClothFlow: A Flow-Based Model for Clothed Person Generation", ICCV 2019 open access [retrieved Feb. 19, 2023]. Retrieved from the Internet <https://asset-pdf.scinapse.io/prod/2991079364/2991079364.pdf>., Nov. 2019, 10 Pages.

Han, Xintong et al., "VITON: An Image-Based Virtual Try-on Network", IEEE/CVF Conference on Computer Vision and Pattern Recognition [retrieved Feb. 19, 2023]. Retrieved from the Internet <https://openaccess.thecvf.com/content_cvpr_2018/papers/Han_VITON_An_Image-Based_CVPR_2018_paper.pdf>., Jun. 2018, 10 Pages.

He, Kaiming et al., "Deep Residual Learning for Image Recognition", Cornell University arXiv Preprint, arXiv.org [retrieved Aug. 11, 2023]. Retrieved from the Internet <https://arxiv.org/pdf/1512.03385.pdf>., Dec. 10, 2015, 12 pages.

Heusel, Martin et al., "GANs Trained by a Two Time-Scale Update Rule Converge to a Local Nash Equilibrium", NIPS'17: Proceedings of the 31st International Conference on Neural Information Processing Systems [retrieved Feb. 21, 2023]. Retrieved from the Internet <https://proceedings.neurips.cc/paper/2017/file/8a1d694707eb0fefe65871369074926d-Paper.pdf>., Jan. 12, 2018, 12 pages.

Horé, Alain et al., "Image quality metrics: Psnr vs. ssim", 2010 International Conference on Pattern Recognition [retrieved Mar. 9, 2023]. Retrieved from the Internet <https://ieeexplore.ieee.org/abstract/document/5596999>., Aug. 2010, 4 Pages.

Isola, Phillip et al., "Image-to-Image Translation with Conditional Adversarial Networks", 2017 IEEE Conference on Computer Vision and Pattern Recognition (CVPR) [retrieved Feb. 19, 2023]. Retrieved from the Internet <https://gangw.web.illinois.edu/class/cs598/papers/CVPR17-img2img.pdf>., Nov. 22, 2017, 17 pages.

Jain, Rishabh et al., "VGFlow: Visibility guided Flow Network for Human Reposing", Cornell University arXiv, arXiv.org [retrieved Feb. 19, 2023]. Retrieved from the Internet <https://arxiv.org/pdf/2211.08540.pdf>., Nov. 26, 2022, 20 Pages.

Jiang, Wei et al., "Neuman: Neural human radiance field from a single video", Cornell University arXiv, arXiv.org [retrieved Feb. 19, 2023]. Retrieved from the Internet <https://arxiv.org/pdf/2203.12575.pdf?trk=public_post_comment-text>., Sep. 22, 2022, 21 Pages.

Kingma, Diederik P. et al., "Adam: A Method for Stochastic Optimization", Cornell University, arXiv Preprint, arXiv.org [retrieved Aug. 9, 2023]. Retrieved from the Internet <https://arxiv.org/pdf/1412.6980.pdf>., Jan. 30, 2017, 15 pages.

Li, Yining et al., "Dense Intrinsic Appearance Flow for Human Pose Transfer", Cornell University, arXiv Preprint, arxiv.org [retrieved Feb. 19, 2023]. Retrieved from the Internet <https://arxiv.org/pdf/1903.11326.pdf>., Mar. 2019, 17 Pages.

Li, Zhen et al., "Towards an End-to-End Framework for Flow-Guided Video Inpainting", Cornell University arXiv, arXiv.org [retrieved Feb. 19, 2023]. Retrieved from the Internet <https://arxiv.org/pdf/2204.02663.pdf>., Apr. 7, 2022, 16 Pages.

Li, Zhengqi et al., "Neural Scene Flow Fields for Space-Time View Synthesis of Dynamic Scenes", Cornell University arXiv, arXiv.org [retrieved Feb. 19, 2023]. Retrieved from the Internet <https://arxiv.org/pdf/2011.13084.pdf>., Apr. 21, 2021, 11 Pages.

Liu, Lingjie et al., "Neural Actor: Neural Free-view Synthesis of Human Actors with Pose Control", Cornell University arXiv, arXiv.org [retrieved Feb. 19, 2023]. Retrieved from the Internet <https://arxiv.org/pdf/2106.02019.pdf>., Jan. 4, 2022, 16 Pages.

Liu, Wen et al., "Liquid Warping GAN: A Unified Framework for Human Motion Imitation, Appearance Transfer and Novel View Synthesis", Cornell University arXiv, arXiv.org [retrieved Feb. 19, 2023]. Retrieved from the Internet <https://arxiv.org/pdf/1909.12224.pdf>., Oct. 1, 2019, 11 Pages.

Liu, Ze et al., "Swin Transformer: Hierarchical Vision Transformer Using Shifted Windows", Cornell University arXiv, arXiv.org [retrieved Feb. 19, 2023]. Retrieved from the Internet <https://arxiv.org/pdf/2103.14030.pdf>., Aug. 17, 2021, 14 Pages.

Liu, Ziwei et al., "DeepFashion: Powering Robust Clothes Recognition and Retrieval with Rich Annotations", Proceedings of the IEEE Conference on Computer Vision and Pattern Recognition (CVPR) [retrieved on Feb. 19, 2023], Retrieved from the Internet: <URL:https://openaccess.thecvf.com/content_cvpr_2016/papers/Liu_DeepFashion_Powering_Robust_CVPR_2016_paper.pdf>., Jun. 2016, 9 pages.

Long, Fan et al., "Optical-flow-based framework to boost video object detection performance with object enhancement", Expert Systems with Applications, vol. 170 [retrieved Feb. 19, 2023]. Retrieved from the Internet <https://doi.org/10.1016/j.eswa.2020.114544>, Dec. 30, 2020, 8 pages.

Loper, Matthew et al., "SMPL: a skinned multi-person linear model", ACM Transactions on Graphics, vol. 34, No. 6 [retrieved Feb. 19, 2023]. Retrieved from the Internet <https://www.researchgate.net/publication/287815055_SMPL_a_skinned_multi-person_linear_model>., Nov. 2, 2015, 16 Pages.

Lv, Zhengyao et al., "Learning Semantic Person Image Generation by Region-Adaptive Normalization", Cornell University arXiv, arXiv.org [retrieved Feb. 19, 2023]. Retrieved from the Internet <https://arxiv.org/pdf/2104.06650.pdf>., Apr. 14, 2021, 15 Pages.

Ma, Liqian et al., "Pose Guided Person Image Generation", Proceedings of the 31st International Conference on Neural Information Processing Systems [retrieved Feb. 19, 2023]. Retrieved from

(56) References Cited

OTHER PUBLICATIONS the Internet <https://charliememory.github.io/pdf/NIPS17_Ma_Pose_Guided_Person_Image_Generation.pdf>., Dec. 4, 2017, 11 Pages.
Ma, Liyuan et al., "FDA-GAN: Flow-based Dual Attention GAN for Human Pose Transfer", Cornell University arXiv, arXiv.org [retrieved Feb. 19, 2023]. Retrieved from the Internet <https://arxiv.org/pdf/2112.00281.pdf>., Dec. 1, 2021, 12 Pages.
Mao, Xudong et al., "Least Squares Generative Adversarial Networks", IEEE Transactions on Pattern Analysis and Machine Intelligence, vol. 41, No. 12, [retrieved on Feb. 19, 2023], Retrieved from the Internet <https://arxiv.org/pdf/1611.04076.pdf>, Apr. 5, 2017, 16 pages.
Mao, Xudong et al., "Multi-class Generative Adversarial Networks with the L2 Loss Function", Cornell University arXiv, arXiv.org [retrieved Feb. 19, 2023]. Retrieved from the Internet <https://www.researchgate.net/publication/310235006_Multi-class_Generative_Adversarial_Networks_with_the_L2_Loss_Function>., Nov. 13, 2016, 15 Pages.
Men, Yifang et al., "Controllable Person Image Synthesis with Attribute-Decomposed GAN", Cornell University arXiv, arXiv.org [retrieved Feb. 19, 2023]. Retrieved from the Internet <https://arxiv.org/pdf/2003.12267.pdf>., Jul. 19, 2020, 10 Pages.
Moses Setiadi, De Rosal Igantius , "PSNR vs SSIM: imperceptibility quality assessment for image steganography", Multimedia Tools and Applications, vol. 80, No. 6 [retrieved Feb. 19, 2023]. Retrieved from the Internet <https://doi.org/10.1007/s11042-020-10035-z>, Mar. 1, 2021, 22 pages.
Pratama, Mahardhika et al., "Scalable teacher forcing network for semi-supervised large scale data streams", Cornell University arXiv, arXiv.org [retrieved Feb. 19, 2023]. Retrieved from the Internet <https://arxiv.org/pdf/2107.02943.pdf>., Jun. 26, 2021, 52 Pages.
Ramon, Eduard et al., "H3D-Net: Few-Shot High-Fidelity 3D Head Reconstruction", Computer Vision Foundation [retrieved Feb. 19, 2023]. Retrieved from the Internet <https://imatge.upc.edu/web/sites/default/files/pub/cRamonb.pdf>., 2021, 10 Pages.
Ren, Jian et al., "Flow Guided Transformable Bottleneck Networks for Motion Retargeting", Cornell University arXiv, arXiv.org [retrieved Feb. 19, 2023]. Retrieved from the Internet <https://arxiv.org/pdf/2106.07771.pdf>., Jun. 14, 2021, 11 Pages.
Ren, Yurui et al., "Deep Image Spatial Transformation for Person Image Generation", Cornell University arXiv, arXiv.org [retrieved 2023-02-019]. Retrieved from the Internet <https://arxiv.org/pdf/2003.00696.pdf>., Mar. 18, 2020, 17 Pages.
Ren, Yurui et al., "Neural Texture Extraction and Distribution for Controllable Person Image Synthesis", Cornell University arXiv, arXiv.org [retrieved Feb. 19, 2023]. Retrieved from the Internet <https://arxiv.org/pdf/2204.06160.pdf>., Apr. 13, 2022, 21 Pages.
Ronneberger, Olaf et al., "U-Net: Convolutional Networks for Biomedical Image Segmentation", Cornell University arXiv, arXiv.org [retrieved Mar. 16, 2023]. Retrieved from the Internet <https://arxiv.org/pdf/1505.04597.pdf>., May 18, 2015, 8 pages.
Seshadrinathan, Kalpana et al., "Unifying analysis of full reference image quality assessment", 15th IEEE International Conference on Image Processing [retrieved Feb. 19, 2023]. Retrieved from the Internet <https://utw10503.utweb.utexas.edu/publications/2008/ks_unifying_icip08.pdf>., 10/2208, 4 Pages.
Siarohin, Aliaksandr et al., "Deformable GANs for Pose-based Human Image Generation", Cornell University arXiv, arXiv.org [retrieved Feb. 19, 2023]. Retrieved from the Internet <https://arxiv.org/pdf/1801.00055.pdf>., Apr. 6, 2018, 20 Pages.
Simonyan, Karen et al., "Very Deep Convolutional Networks for Large-Scale Image Recognition", arXiv Preprint, Cornell University, arXiv.org [retrieved Feb. 19, 2023]. Retrieved from the Internet <https://arxiv.org/pdf/1409.1556.pdf>., Sep. 2014, 14 pages.
Song, Sijie et al., "Unsupervised Person Image Generation with Semantic Parsing Transformation", Cornell University arXiv, arXiv.org [retrieved Feb. 19, 2023]. Retrieved from the Internet <https://arxiv.org/pdf/1904.03379.pdf>., Apr. 18, 2019, 10 Pages.
Teed, Zachary et al., "RAFT: Recurrent All-Pairs Field Transforms for Optical Flow", Cornell University arXiv, arXiv.org [retrieved Mar. 9, 2023]. Retrieved from the Internet <https://arxiv.org/pdf/2003.12039.pdf>., Aug. 25, 2020, 21 Pages.
Wedel, A et al., "An improved algorithm for tv-l 1 optical flow", Statistical and Geometrical Approaches to Visual Motion Analysis: International Dagstuhl Seminar, Dagstuhl Castle, Germany [retrieved Feb. 19, 2023]. Retrieved from the Internet <https://cvai.in.tum.de/_media/spezial/bib/dagstuhlopticalflowchapter.pdf>., Jul. 4, 2009, 23 Pages.
Weng, Chung-Yi et al., "HumanNeRF: Free-viewpoint Rendering of Moving People from Monocular Video", Cornell University arXiv, arXiv.org [retrieved Feb. 19, 2023]. Retrieved from the Internet <https://arxiv.org/pdf/2201.04127.pdf>., Jan. 2022, 15 Pages.
Weng, Chung-Yi et al., "Vid2Actor: Free-viewpoint Animatable Person Synthesis from Video in the Wild", Cornell University arXiv, arXiv.org [retrieved Feb. 19, 2023]. Retrieved from the Internet <https://arxiv.org/pdf/2012.12884.pdf>., Dec. 23, 2020, 10 Pages.
Xiao, Tete et al., "Unified Perceptual Parsing for Scene Understanding", Cornell University arXiv, arXiv.org [retrieved Feb. 19, 2023]. Retrieved from the Internet <https://arxiv.org/pdf/1807.10221.pdf>., Jul. 26, 2018, 18 Pages.
Xie, Enze et al., "SegFormer: Simple and Efficient Design for Semantic Segmentation with Transformers", Cornell University arXiv, arXiv.org [retrieved Feb. 19, 2023]. Retrieved from the Internet <https://arxiv.org/pdf/2105.15203.pdf>., Oct. 28, 2021, 18 Pages.
Xu, Haofei , "GMFlow: Learning Optical Flow via Global Matching", Cornell University arXiv, arXiv.org [retrieved Feb. 19, 2023]. Retrieved from the Internet <https://arxiv.org/pdf/2111.13680.pdf>., Jul. 17, 2022, 13 Pages.
Yan, Han et al., "Towards Photo-Realistic Virtual Try-On by Adaptively Generating↔Preserving Image Content", Cornell University arXiv, arXiv.org [retrieved Feb. 19, 2023]. Retrieved from the Internet <https://arxiv.org/pdf/2003.05863.pdf>., Mar. 12, 2020, 13 Pages.
Yenamandra, Tarun et al., "i3DMM: Deep Implicit 3D Morphable Model of Human Heads", Cornell University arXiv, arXiv.org [retrieved Feb. 19, 2023]. Retrieved from the Internet <https://arxiv.org/pdf/2011.14143.pdf>., Nov. 28, 2020, 18 Pages.
Zhang, Pan et al., "Cross-Domain Correspondence Learning for Exemplar-Based Image Translation", Cornell University arXiv, arXiv.org [retrieved Feb. 19, 2023]. Retrieved from the Internet <https://arxiv.org/pdf/2004.05571.pdf>., Apr. 12, 2020, 23 Pages.
Zhang, Richard et al., "The Unreasonable Effectiveness of Deep Features as a Perceptual Metric", Cornell University arXiv, arXiv.org [retrieved Aug. 11, 2023]. Retrieved from the Internet <https://arxiv.org/pdf/1801.03924.pdf>., Apr. 10, 2018, 14 Pages.
Zhou, Xinyue et al., "Cross Attention Based Style Distribution for Controllable Person Image Synthesis", Cornell University arXiv, arXiv.org [retrieved Feb. 19, 2023]. Retrieved from the Internet <https://arxiv.org/pdf/2208.00712.pdf>., Aug. 1, 2022, 23 Pages.
Zhu, Zhen et al., "Progressive Pose Attention Transfer for Person Image Generation", Cornell University arXiv, arXiv.org [retrieved Feb. 19, 2023]. Retrieved from the Internet <https://arxiv.org/pdf/1904.03349.pdf>., May 13, 2019, 21 Pages.
Human Appearance Transfer—Zanfir—9 pages—2018—2018 IEEE/CVF Conference on Computer Vision and Pattern Recognition (CVPR), pp. 5391-5399.
Non-Final Office Action—U.S. Appl. No. 18/213,118—19 pages—Oct. 24, 2025—U.S. Appl. No. 18/213,118.
PWC-Net: CNNs for Optical Flow Using Pyramid, Warping, and Cost Volume—Sun—18 pafges—Jun. 25, 2018—arXiv, Cornell University.
Self-Supervised Object Detection via Generative Image Synthesis—Mustikovela—10 pages—Oct. 2021—2021 IEEE/CVF International Conference on Computer Vision (ICCV).

* cited by examiner 204
3 source images
Target image
Vis Maps
Visible regions encoded in RGB
610
608
Per-Pixel soft Selection mask
606
604
602
Multi layer embeddings
Target Pose

600

Collect training data 1002

Identify relevant features 1004

Initialize first, second, and third machine-learning models 1006

Pretrain second machine learning model 1008

Train first machine learning model 1010

Train second machine learning model 1012

Train third machine learning model 1014

Set hyperparameters 1016

Train the first, second, and third machine-learning models end-to-end using the training data 1018

Stopping Criterion Met? 1020

No

Yes

Generate an output based on subsequent data using trained first, second, and third machine-learning models 1022

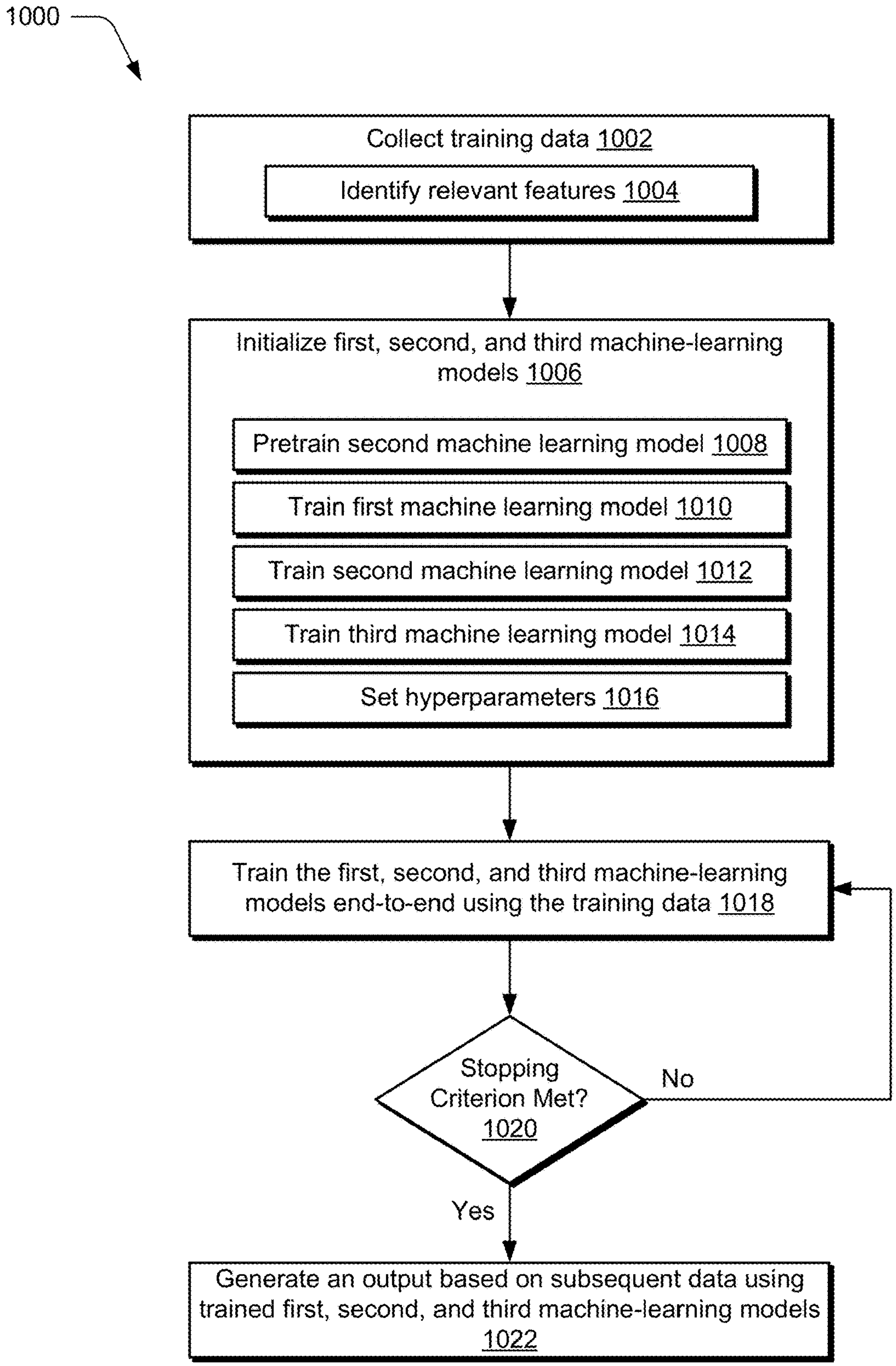

1102
Receive input data describing: input digital images; pluralities of keypoints corresponding to the input digital images, the pluralities of keypoints representing poses of a person depicted in the input digital images; and a plurality of keypoints representing a target pose 1104
Generate selection masks corresponding to the input digital images by processing the input data using a machine learning model, the selection masks representing likelihoods of spatial correspondence between pixels of an output digital image and portions of the input digital images 1106
Generate the output digital image depicting the person in the target pose for display in a user interface based on the selection masks and the input data

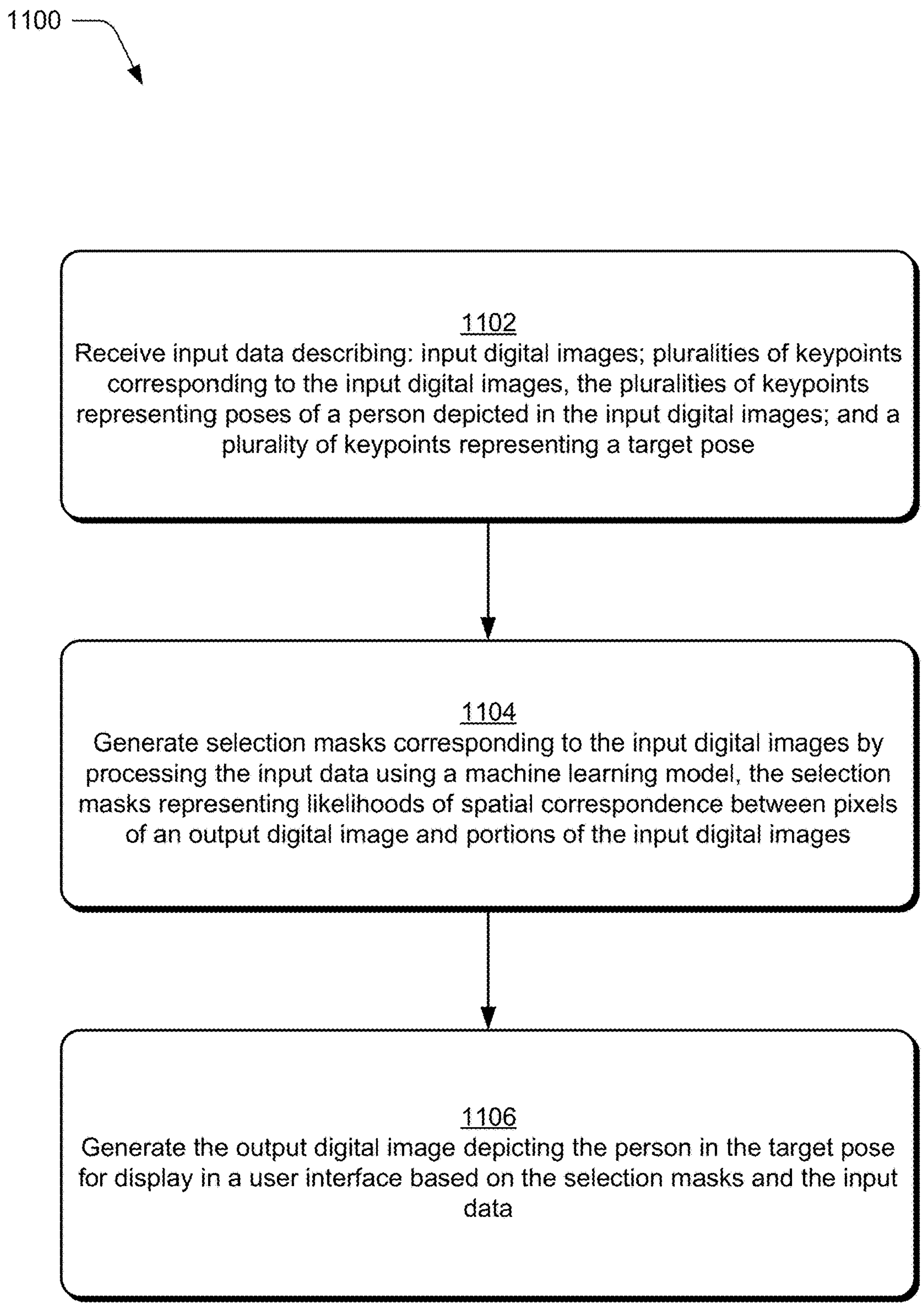

*Fig. 11*

1202
Receive input data describing: input digital images; pluralities of keypoints corresponding to the input digital images, the pluralities of keypoints representing poses of a person depicted in the input digital images; and a plurality of keypoints representing a target pose 1204
Generate two-dimensional selection masks by processing the input data using a machine learning model, each of the two-dimensional selection masks indicating likelihoods of spatial correspondence between positions of an input digital image and output pixels of an output digital image depicting the person in the target pose 1206
Generate the output digital image for display in a user interface based on the two-dimensional selection masks and the input data

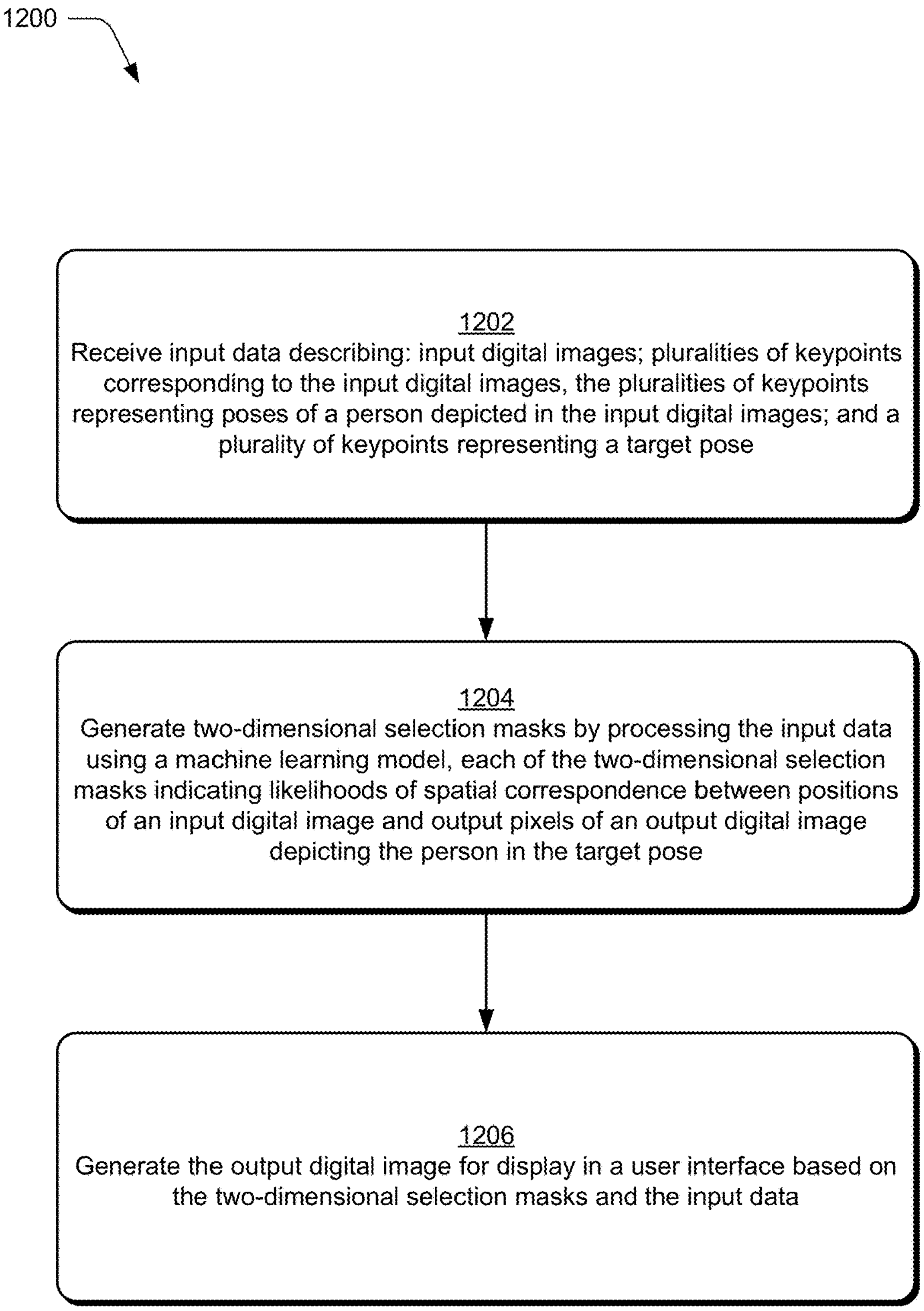

*Fig. 12*

DIGITAL IMAGE REPOSING BASED ON MULTIPLE INPUT VIEWS

BACKGROUND

Reposing is a technique used in digital images to capture an object from different viewpoints, in different configurations, and so on. Reposing of a human model wearing an item of clothing, for instance, is typically utilized to increase a viewer's understanding of the item of clothing as worn by the human model from different angles, different positions of extremities of the human model's body, and so forth. Conventional techniques to do so, however, encounter numerous technical challenges that result in visual artifacts and inefficient use of computational resources used to implement these conventional techniques.

SUMMARY

Techniques and systems for human reposing based on multiple input views are described. In an example, a computing device implements a reposing system to receive input data describing input digital images and corresponding keypoints for poses of a person depicted in the input digital images. In this example, the input data also described keypoints for a target pose.

For example, the reposing system generates selection masks corresponding to the input digital images by processing the input data using a machine learning model trained on training data to generate selection masks. The selection masks represent likelihoods of spatial correspondence between pixels of an output digital image and portions of the input digital images. In one example, the reposing system generates the output digital image depicting the person in the target pose for display in a user interface based on the selection masks and the input data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 10 illustrates a representation of training a first machine learning model, a second machine learning model, and a third machine learning model.

FIG. 11 is a flow diagram depicting a procedure in an example implementation in which an output image is generated depicting a person in a target pose based on input data.

FIG. 12 is a flow diagram depicting a procedure in an example implementation in which two-dimensional selection masks are generated based on input data.

DETAILED DESCRIPTION

Overview

Figure 1:
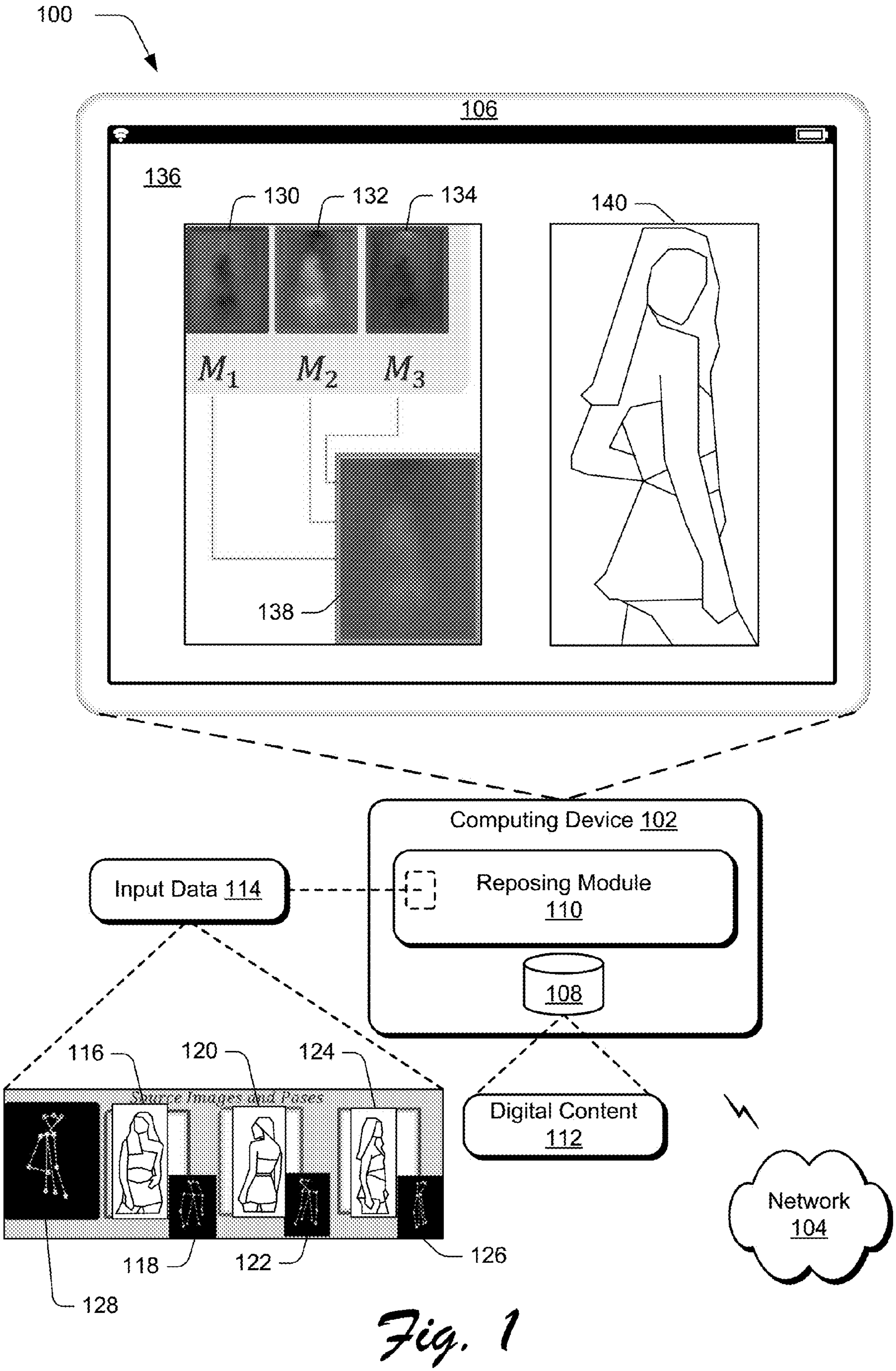
FIG. 1 is an illustration of an environment in an example implementation that is operable to employ digital systems and techniques for human reposing based on multiple input views as described herein.

Conventional systems for human reposing generate an output image depicting a person in a target pose based on a single source image depicting the person in a source pose. In scenarios in which the source pose and the target pose differ significantly (e.g., the person is facing forwards in the source pose and the person is facing backwards in the target pose), conventional systems often generate the output digital image as including artifacts and occlusions. These artifacts and occlusions occur because conventional systems infer portions of the person which are visible in the target pose based on information that is not available in the single source image (e.g., a pattern on a backside of shirt worn by the person) which is a limitation of the conventional systems.

In order to overcome this limitation, techniques and systems for human reposing based on multiple input views are described. For example, a computing device implements a reposing system to receive input data describing input digital images depicting a person, keypoints for poses of the person depicted in the input digital images, and keypoints for a target pose. In an example, the target pose is significantly different from poses of the person depicted in the input digital images. In this example, the reposing system generates an output digital image depicting the person in the target pose using first, second, and third machine learning models.

In one example, the first machine learning model includes a convolutional neural network, and the reposing system processes the input data using the first machine learning module to generate a visibility segment map for each of the input digital images. The visibility segment maps indicate portions of the person in the target pose that are visible in a corresponding one of the input digital images and portions of the person in the target pose that are invisible (e.g., are not visible) in the corresponding one of the input digital images. The reposing system also generates a first predicted image and a second predicted image for each of the input digital images based on processing the input data using the first machine learning model.

To do so in one example, the reposing system generates first and second flow-field pyramids for the portions of the person in the target pose that are visible and the portions of the person in the target pose that are invisible in each of the input digital images, respectively. For example, the reposing system generates both of the first and second flow-field pyramids at multiple different resolutions or scales. The reposing system then combines the first flow-field pyramids using gated aggregation to generate first composite flows for the portions of the person in the target pose that are visible each of the input digital images. For instance, the reposing system generates the first predicted images based on the portions of the person in the target pose that are visible in each of the input digital images by performing convex upsampling on the first composite flows.

Similarly, the reposing system combines the second flow-field pyramids using gated aggregation to generate second composite flows for the portions of the person in the target pose that are invisible in each of the input digital images. The reposing system generates the second predicted images based on the portions of the person in the target pose that are invisible in each of the input digital images by performing convex upsampling on the second composite flows. In addition to generating a visibility segment map, a first predicted image, and a second predicted image for each of the input digital images by processing the input data using the first machine learning model, the reposing system implements a selection machine learning model 904 using a second machine learning model to process the input data in order to generate a selection mask for each of the input digital images. For example, the second machine learning model includes a transformer and a feature pyramid network, and the selection masks represent likelihoods of spatial correspondence between pixels of the output digital image and portions of the input digital images.

The reposing system implements the transformer of the second machine learning model to capture inter-channel relationships between the input digital images depicting the person, the keypoints for the poses of the person depicted in the input digital images, and the keypoints for the target pose by predicting soft attention over each of the input digital images conditioned on the target pose. In one example, this includes using self-attention within shifting windows and cross-attention between shifting windows. In this example, the reposing system implements the feature pyramid network of the second machine learning model to perform per-pixel segmentation by merging information from multiple different scales. Finally, the reposing system applies SoftMax on outputs from the feature pyramid network to generate a selection mask for each of the input digital images.

After processing the input data using the first and second machine learning models, the reposing system generates the output digital image depicting the person in the target pose by processing outputs from the first and second machine learning models using the third machine learning model. For example, the third machine learning model includes a pose encoder, a texture encoder, and a decoder. The reposing system processes the keypoints for the poses of the person depicted in the input digital images and the keypoints for the target pose using the pose encoder and the reposing system uses the selection masks to generate fused pose features in a feature space.

In an example, the reposing system processes the visibility segment maps, the first predicted images, and the second predicted images using the texture encoder of the third machine learning model to generate texture features in feature space. In this example, the reposing system fuses the texture features with the selection masks to generate fused texture features in the feature space. For instance, the reposing system implements the decoder of the third machine learning model to generate the output digital image depicting the person in the target pose by processing the fused pose features and the fused texture features.

The output digital image accurately and realistically depicts the person in the target pose even though the target pose is significantly different from the poses of the person depicted in the input digital images. This is not possible using conventional systems that generate an output image having artifacts based on a single input image when information needed for the output image (e.g., a pattern of a garment) is unavailable in the single input image. By using multiple input digital images depicting a particular person in different poses to generate an output digital image depicting the particular person in a target pose, the described systems are capable of generating the output digital image with greater accuracy and realism than the conventional systems. This is because information needed for the output digital image (e.g., the pattern of the garment) which is unavailable in one of the input digital images is likely at least partially available in another one of the input digital images for use in generating the output digital image.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 includes a storage device 108 and a reposing module 110. The storage device 108 is illustrated to include digital content 112 such as digital images, digital artwork, digital videos, etc.

The reposing module 110 is illustrated as having, receiving, and/or transmitting input data 114. In an example, the input data 114 describes a first input digital image 116 that depicts a person in first pose and keypoints 118 for the first pose; a second input digital image 120 that depicts the person in a second pose and keypoints 122 for the second pose; a third input digital image 124 that depicts the person in a third pose and keypoints 126 for the third pose; and keypoints 128 for a target pose. In this example, the person is depicted as wearing the same garments in each of the first, second, and third input digital images 116, 120, 124 which include a turquoise-colored top and light-colored shorts. In the first pose, the person is forward facing with a right hand laid on top of the person's right leg, and a left hand resting on the person's waist. In this pose, some of the person's hair is draped over a right portion of the person's chest, and the rest of the person's hair is brushed behind the person's left shoulder.

In the second pose, the person is facing backwards with the person's left and right arms at the person's left and right sides, respectively. Although the person is facing backwards in the second pose, the person is looking towards the person's left, and a left side of the person's face is visible in the second input digital image 120. In the third pose, the person is facing towards the person's right with the person's left and right arms at the person's left and right sides, respectively. As shown, a right side of the person's face is visible, the person's right arm is visible, and the person's left arm is invisible (e.g., is not visible) in the third input digital image 124.

The keypoints 128 for the target pose indicate that this pose is similar to the third pose that is represented by the keypoints 126. For example, in the target pose, the person's chest is facing towards the person's right, and the person's right arm is at the person's right side as in the third pose of the person depicted by the third input digital image 124. However, unlike the third pose in which the right side of the person's face is visible, in the target pose, the person is looking over the person's right shoulder such that the person's face is fully visible. Also, unlike the third pose in which the person's left arm is invisible, in the target pose, the person's left arm is bent at the elbow and extends behind the person's back such that the person's left arm is partially visible in the target pose.

In order to generate an image depicting the person in the target pose represented by the keypoints 128, the reposing module 110 leverages first, second, and third machine learning models which are included in or are accessible to the reposing module 110. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, transformers, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

Consider an example in which the first machine learning model includes a convolutional neural network and the reposing module 110 processes the input data 114 using the first machine learning module to generate a visibility segment map for each of the first, second, and third input digital images 116, 120, 124. In this example, the reposing module 110 implements the first machine learning model to generate the visibility segment map for the first input digital image 116 which indicates portions of the person in the target pose represented by the keypoints 128 that are visible in the first input digital image 116 and portions of the person in the target pose that are invisible (e.g., are not visible) in the first input digital image 116. Similarly, the reposing module 110 generates the visibility segment map for the second input digital image 120 using the first machine learning model, and this visibility segment map indicates portions of the person in the target pose that are visible in the second input digital image 120 as well as portions of the person in the target pose that are invisible in the second input digital image 120. Finally, the reposing module 110 generates the visibility segment map for the third input digital image 124 as indicating portions of the person in the target pose that are visible in the third input digital image 124 and portions of the person in the target pose that are invisible in the third input digital image 124.

In an example, the reposing module 110 also generates a first predicted image and a second predicted image for each of the first, second, and third input digital images 116, 120, 124 using the first machine learning model based on processing the input data 114. The reposing module 110 generates the first predicted images for the first, second, and third input digital images 116, 120, 124 based on portions of the person in the target pose that are visible in the first, second, and third input digital images 116, 120, 124, respectively. In one example, the reposing module 110 generates the second predicted images for the first, second, and third input digital images 116, 120, 124 based on portions of the person in the target pose that are invisible in the first, second, and third input digital images 116, 120, 124, respectively.

For example, the reposing module 110 generates the first and second predicted images by generating first and second flow-field pyramids for the portions of the person in the target pose that are visible and invisible in the first, second, and third input digital images 116, 120, 124, respectively. The reposing module 110 generates the first predicted images by using the first flow-field pyramids to warp the first, second, and third input digital images 116, 120, 124 to align with the target pose. Similarly, the reposing module 110 generates the second predicted images by using the second flow-field pyramids to warp the first, second, and third input digital images 116, 120, 124 to align with the target pose.

To do so in one example, the reposing module 110 generates both of the first and second flow-field pyramids at multiple different resolutions or scales. By generating the first and second flow-field pyramids in this way, the first machine learning model is capable of processing and refining the multiple different resolutions or scales sequentially to generate composite flows. The reposing module 110 combines the first flow-field pyramids using gated aggregation to generate first composite flows for the portions of the person in the target pose that are visible in the first, second, and third input digital images 116, 120, 124. For instance, the reposing module 110 also combines the second flow-field pyramids using gated aggregation to generate second composite flows for the portions of the person in the target pose that are invisible in the first, second, and third input digital images 116, 120, 124. The reposing module 110 generates the first predicted images by performing convex upsampling on the first composite flows and the reposing module 110 generates the second predicted images by performing convex upsampling on the second composite flows.

Consider an example in which the second machine learning model includes a transformer and a feature pyramid network and the reposing module 110 implements the second machine learning model to processes the input data 114 to predict conditional soft attention over the first, second, and third input digital images 116, 120, 124 which is conditioned on the target pose represented by the keypoints 128. For example, the reposing module 110 implements the transformer of the second machine learning model to capture inter-channel relationships between the first, second, and third input digital images 116, 120, 124 and the keypoints 118 for the first pose, the keypoints 122 for the second pose, and the keypoints 126 for the third pose using self-attention within shifting windows and cross-attention between shifting windows. In this example, the reposing module 110 implements the feature pyramid network of the second machine learning model to perform per-pixel segmentation by merging information from multiple different scales. Finally, the reposing module 110 applies SoftMax on outputs from the feature pyramid network to generate a first selection mask 130 for the first input digital image 116, a second selection mask 132 for the second input digital image 120, and a third-selection mask 134 for the third input digital image 124.

As shown, the first, second, and third selection masks 130, 132, 134 are displayed in a user interface 136 of the display device. For example, the first, second, and third selection masks 130, 132, 134 are two-dimensional and represent likelihoods of spatial correspondence between output pixels and portions of the first, second, and third input digital images 116, 120, 124, respectively. In an example, when the first, second, and third selection masks 130, 132, 134 are combined, the combination forms a representation 138 which is also displayed in the user interface 136 of the display device 106.

In some examples, the third machine learning model includes a pose encoder, a texture encoder, and a decoder. In these examples, the reposing module 110 implements the pose encoder of the third machine learning model to process the keypoints 118 for the first pose, the keypoints 122 for the second pose, the keypoints 126 for the third pose, and the keypoints 128 for the target pose, and the reposing module 110 uses the first, second, and third selection masks 130, 132, 134 to fuse fused pose features in a feature space in order to generate fused pose features $$e_p^{fused}.$$

In one example, the reposing module 110 generates the fused pose features $$e_p^{fused}$$

using a weighted average via the first, second, and third selection masks 130, 132, 134.

For example, the reposing module 110 implements the texture encoder of the third machine learning model to process the visibility segment map, the first predicted image, and the second predicted image for each of the first, second, and third input digital images 116, 120, 124, and the reposing module 110 uses the first, second, and third selection masks 130, 132, 134 to fuse texture features in a feature space in order to generate fused texture features $$e_t^{fused}.$$

In an example, the reposing module 110 generates the fused texture features $$e_t^{fused}$$

used using a weighted average via the first, second, and third selection masks 130, 132, 134. Continuing this example, the reposing module 110 processes the fused texture features $$e_t^{fused}$$

and the fused pose features $$e_p^{fused}$$

using the decoder of the third machine learning model in order to generate an output digital image 140. As shown, the output digital image 140 is displayed in the user interface 136 and realistically depicts the person in the target pose.

The representation 138 indicates portions of the first, second, and third input digital images 116, 120, 124 likely used (e.g., having a high probability of being used) to generate the output digital image 140. Red colors depicted in the representation 138 correspond to portions of the first input digital image 116 likely used to infer corresponding portions of the output digital image 140; green colors depicted in the representation 138 correspond to portions of the second input digital image 120 likely used to infer corresponding portions of the output digital image 140; and blue colors depicted in the representation 138 correspond to portions of the third input digital image 124 likely used to infer corresponding portions of the output digital image 140. As shown in the representation 138, the reposing module 110 has caused the first, second, and third machine learning models to use portions from each of the first, second, and third input digital images 116, 120, 124 in order to infer/generate the output digital image 140.

By using portions from each of the first, second, and third input digital images 116, 120, 124 to generate the output digital image 140 in this manner, the reposing module 110 is capable of generating the output digital image 140 as having a more accurate and realistic appearance than generating the output digital image 140 based a single one of the first, second, and third input digital images 116, 120, 124 as in conventional systems. Notably, although the third pose of the person represented by the keypoints 126 and depicted by the third input digital image 124 is similar to the target pose of the person represented by the keypoints 128 and depicted in the output digital image 140, the reposing module 110 likely generates the output digital image 140 using more regions of the second input digital image 120 (colored green in the representation 138) than regions of the third input digital image 124 (colored blue in the representation 138). This causes the resulting appearance of the output digital image 140 to be realistic which is not possible in conventional systems that generate images for human reposing from a single input image (e.g., using either the second input digital image 120 or the third input digital image 124).

Figure 2:
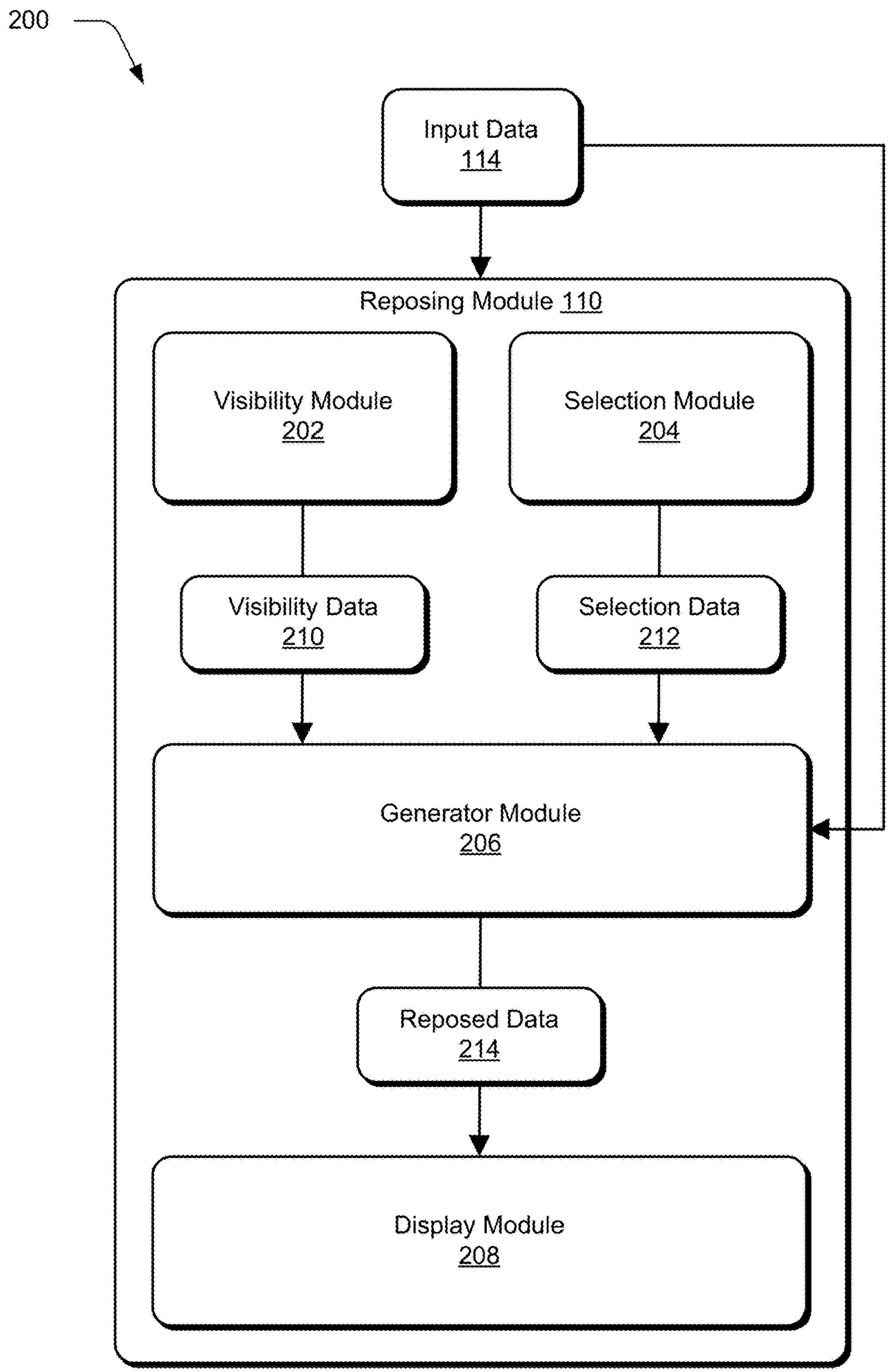
FIG. 2 depicts a system in an example implementation showing operation of a reposing module for human reposing based on multiple input views.

FIG. 2 depicts a system 200 in an example implementation showing operation of a reposing module 110. The reposing module 110 is illustrated to include a visibility module 202, a selection module 204, a generator module 206, and a display module 208. For instance, the visibility module 202 is illustrated as receiving the input data 114 as an input, and the selection module 204 is also illustrated as receiving the input data 114 as an input.

Figure 3:
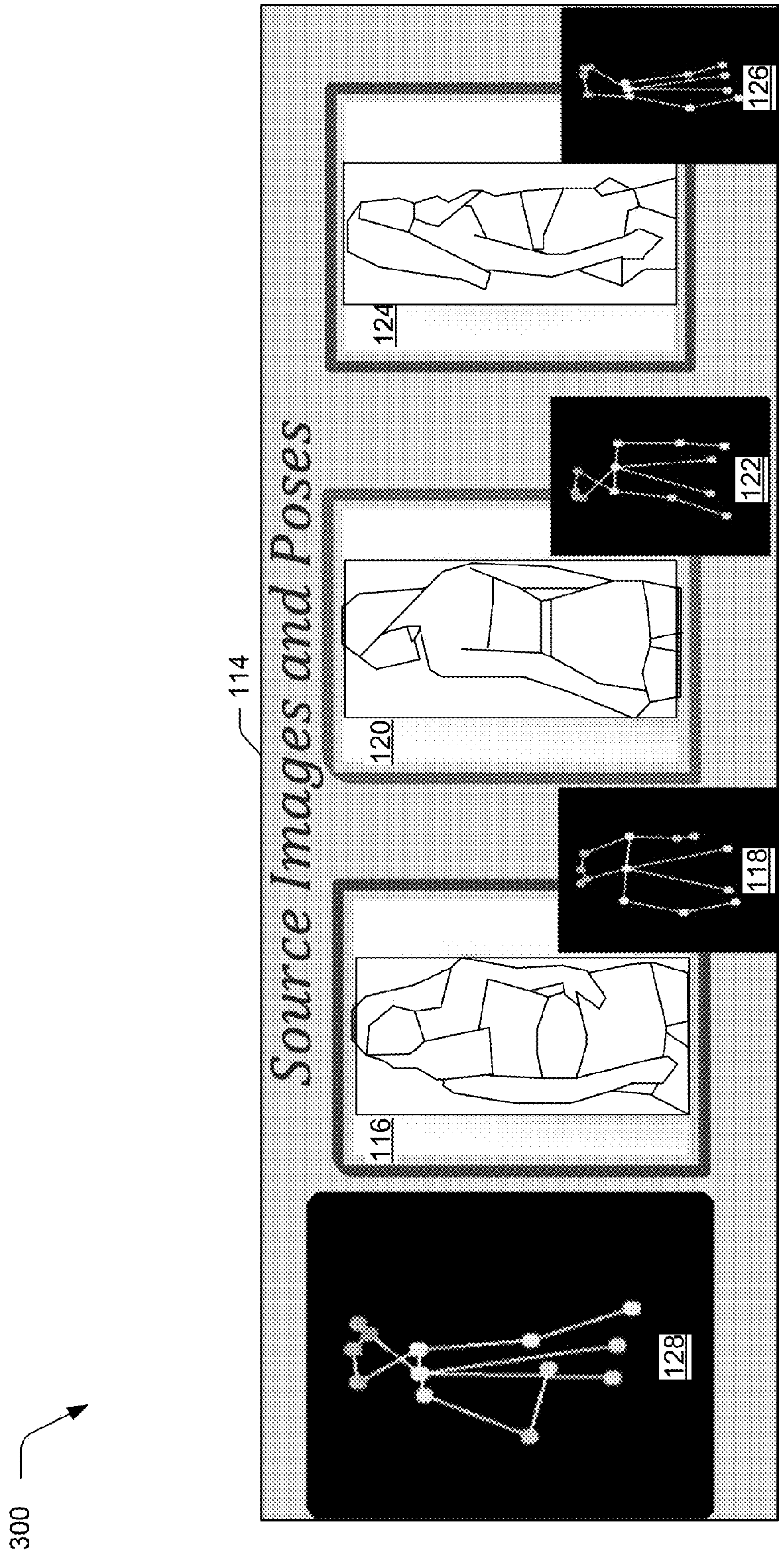
FIG. 3 illustrates a representation of input data.

FIG. 3 illustrates a representation 300 of input data 114. As shown in the representation 300, the input data 114 describes the first input digital image 116 depicting the person in the first pose, the keypoints 118 for the first pose, the second input digital image 120 depicting the person in the second pose, the keypoints 122 for the second pose, the third input digital image 124 depicting the person in the third pose, the keypoints 126 for the third pose, and the keypoints 128 for the target pose. Although the input data 114 is illustrated as describing the first, second, and third input digital images 116, 120, 124, it is to be understood that in some examples, the input data 114 describes less than three input digital images (e.g., the first and second input digital images 116, 120). In other examples, the input data 114 describes more than three input digital images such as four input digital images, five input digital images, six input digital images, etc. In an example, the visibility module 202 receives and processes the input data 114 in order to generate visibility data 210.

Figure 4:
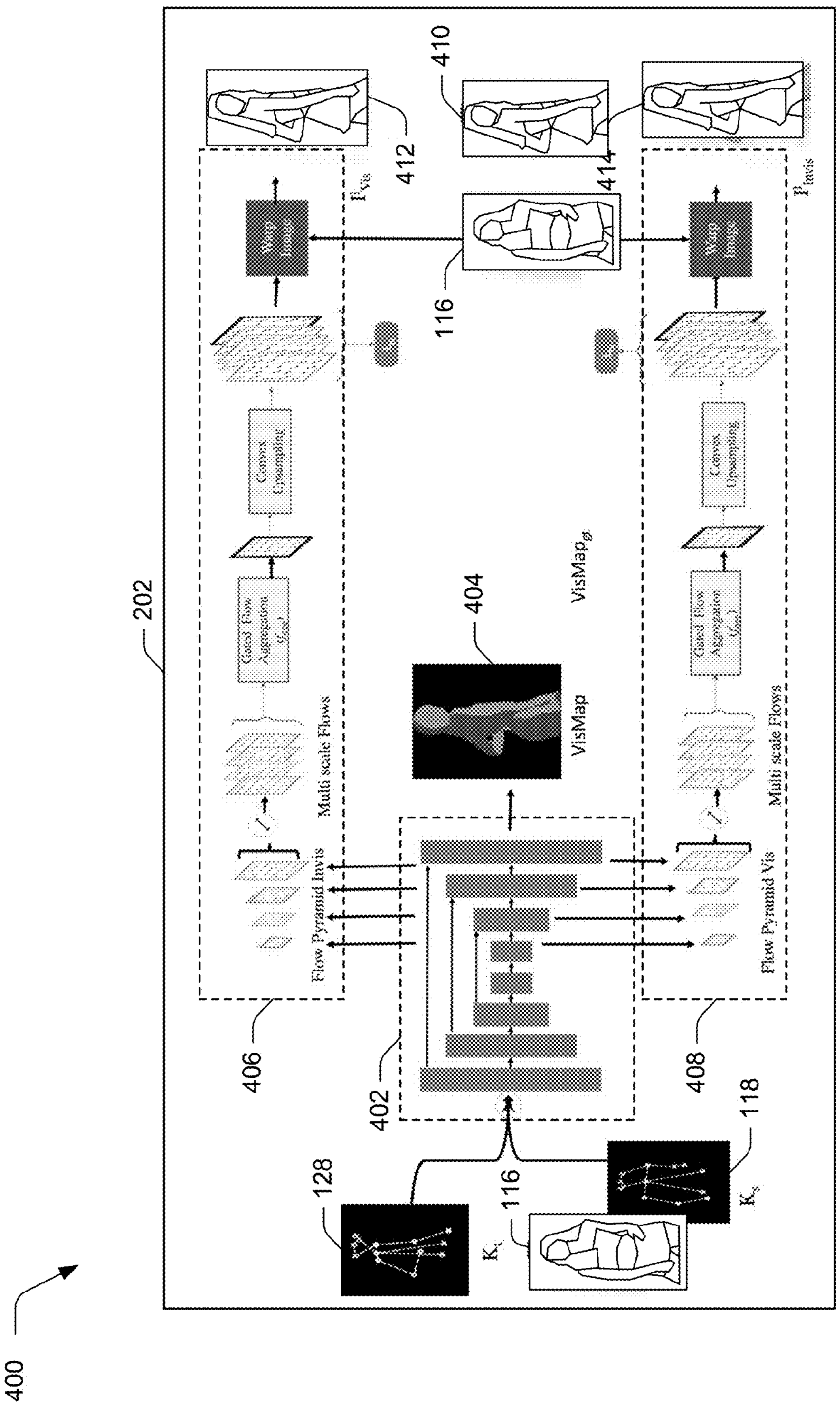
FIG. 4 illustrates a representation of a visibility module.

FIG. 4 illustrates a representation 400 of a visibility module 202. The representation 400 illustrates the first machine learning model which is included in or available to the visibility module 202. For example, the representation 400 also includes the first input digital image 116, the keypoints 118 for the first pose, and the keypoints 128 for the target pose. Although only the first input digital image 116 is illustrated in the representation 400, it is to be appreciated that the first input digital image 116 as also representative of the second input digital image 120 and the third input digital image 124. Similarly, the illustrated keypoints 118 for the first pose are representative of the keypoints 122 for the second pose as well as the keypoints 126 for the third pose.

As shown, the first machine learning model includes a convolutional neural network 402. For example, the first machine learning model includes the convolutional neural network 402 as described by Olaf Ronneberger et al., *U-net: Convolutional Networks for Biomedical Image Segmentation*, arXiv:1505.04597v1 (2015). In an example, the visibility module 202 implements the convolutional neural network 402 to process the input data 114 in order to generate a visibility segment map 404 for the first input digital image 116. The visibility segment map 404 indicates portions of the person in the target pose that are visible in the first input digital image 116 which are colored green. The visibility segment map 404 also indicates portions of the person in the target pose that are invisible (e.g., are not visible) in the first input digital image 116 which are colored red.

Consider an example in which the visibility module 202 generates a ground truth visibility segment map based on the input digital image 116 and the keypoints 128 for the target pose. In some examples, the visibility module 202 determines UV coordinates using techniques described by Riza Alp Güler et al., *Densepose: Dense Human Pose Estimation in the Wild*, In Proceedings of the IEEE Conference on Computer Vision and Pattern Recognition, pages 7297-7306 (2018). For example, the visibility module 202 matches the UV coordinates to generate the ground truth visibility segment map. In one example, the visibility module 202 compares the visibility segment map 404 with the ground truth visibility segment map using a categorical cross entropy loss ($L_{cce}$) as part of training the first machine learning model to generate visibility segment maps that indicate portions of people in poses that are visible in input images and portions of the people in the poses that are invisible in the input images.

The visibility module 202 implements the convolutional neural network 402 to generate visible features 406 and invisible features 408. In an example, the visibility module 202 implements the convolutional neural network 402 to process the input data 114 to generate the visible features 406 by generating per-pixel flow-field pyramids $$f_v^l$$

at different resolutions l. In a similar example, visibility module 202 implements the convolutional neural network 402 to process the input data 114 to generate the invisible features 408 by generating per-pixel flow-field pyramids $$f_i^l$$

at different resolutions l.

For instance, the visibility module 202 uses the flow-field pyramids $$f_v^l$$

and $$f_i^l$$

to warp the first input digital image 116 to align with the target pose represented by the keypoints 128 using a ground truth output image 410 that depicts the person in the target pose. In some examples, the visibility module 202 combines the flow-field pyramids $$f_v^l$$

using gated aggregation as part of generating the visible features 406 and the visibility module 202 combines the flow-field pyramids $$f_i^l$$

using gated aggregation as part of generating the invisible features 408. In an example, the visibility module 202 combines the flow-field pyramids $$f_v^l$$

and combines the flow-field pyramids $$f_i^l$$

using gated aggregation techniques as described by Ayush Chopra et al., *Zflow: Gated appearance flow-based virtual try-on with 3d priors*, In Proceedings of the IEEE/CVF International Conference on Computer Vision, pages 5433-5442 (2021), such that flow values are filtered from different radial neighborhoods to generate a composite flow in the visible features 406 and a composite flow in the invisible features 408.

For example, the visibility module 202 generates a first predicted image 412 for the first input digital image 116 by performing convex upsampling relative to the composite flow in the visible features 406. The first predicted image 412 represents displacements for portions of the person in the target pose which are visible in the first input digital image 116 (e.g., displacements of the green colored portions of the visibility segment map 404). The visibility module 202 generates a second predicted image 414 for the first input digital image 116 by performing convex upsampling on the composite flow in the invisible features 408. As shown, the second predicted image 414 represents displacements for portions of the person in the target pose that are invisible (are not visible) in the first input digital image 116 (e.g., displacements of the red colored portions of the visibility segment map 404).

Figure 5:
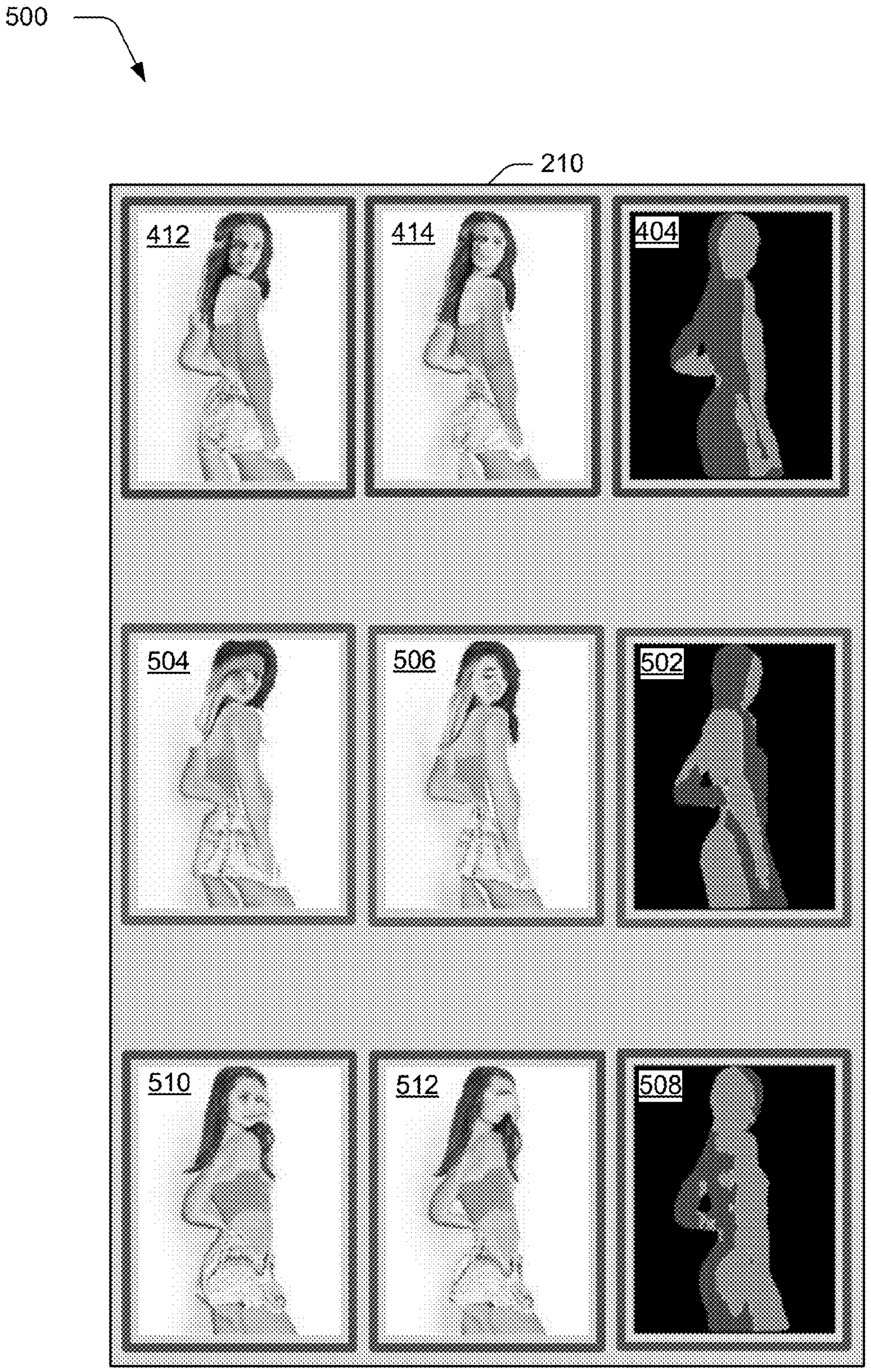
FIG. 5 illustrates a representation of visibility data.

FIG. 5 illustrates a representation 500 of visibility data 210. For example, the visibility module 202 generates the visibility data 210 as describing the first predicted image 412, the second predicted image 414, and the visibility segment map 404 for the first input digital image 116. The visibility module 202 also implements the convolutional neural network 402 to generate a visibility segment map 502, a first predicted image 504, and a second predicted image 506 for the second input digital image 120 as well as a visibility segment map 508, a first predicted image 510, and a second predicted image 512 for the third input digital image 124. As shown in the representation 500, the visibility module 202 generates the visibility data 210 as describing the visibility segment maps 404, 502, 508; the first predicted images 412, 504, 510; and the second predicted images 414, 506, 512.

Figure 6:
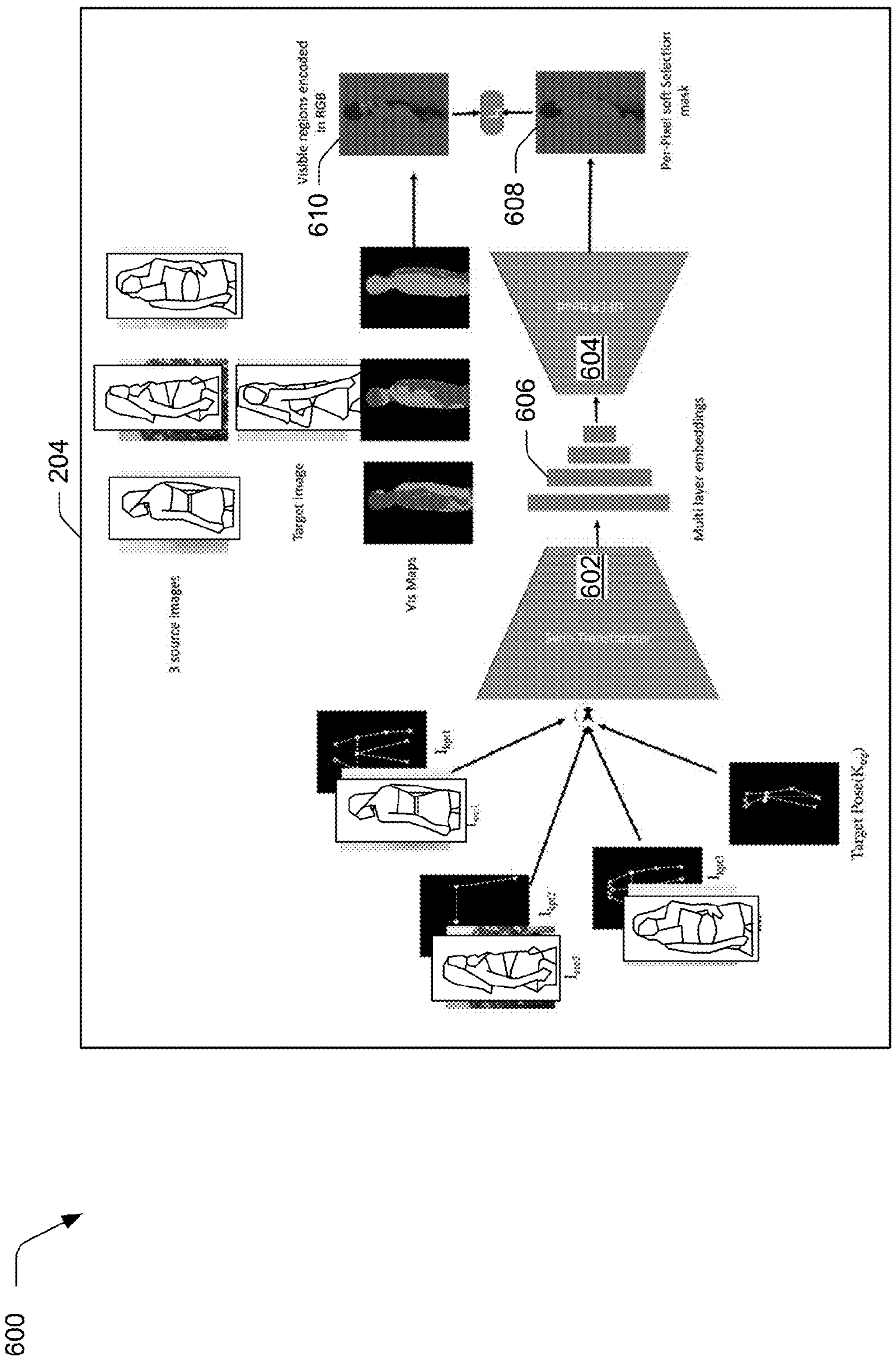
FIG. 6 illustrates a representation of a selection module.

FIG. 6 illustrates a representation 600 of a selection module 204. In an example, the selection module 204 receives and processes the input data 114 to generate selection data 212. In this example, the second machine learning model is included in or available to the selection module 204. For instance, the second machine learning model includes a transformer 602 (e.g., a network of transformer models) and a feature pyramid network 604 to encode and decode multilayer embeddings 606, respectively. In one example, the transformer 602 includes a network as described by Ze Liu et al., *Swin transformer: Hierarchical vision transformer using shifted windows*, In Proceedings of the IEEE/CVF International Conference on Computer Vision, pages 10012-10022 (2021). In another example, the feature pyramid network 604 includes a network as described by Tete Xiao et al., *Unified perceptual parsing for scene understanding*, In Proceedings of the European Conference on Computer Vision, pages 418-434 (2018).

In the illustrated example, the selection module 204 pretrains the second machine learning model to generate visibility segment maps 608 using ground truth visibility segment maps 610 (e.g., obtained using the UV coordinates described previously). As part of this pretraining, the second machine learning model learns to predict masks that select regions of input images that are relevant to reproducing shape, color, and texture details for target poses. For example, the selection module 204 pretrains the second machine learning model on training data to predict the visibility segment maps 608 in a manner similar to a semantic segmentation task except without aligned inputs and outputs and without limiting the second machine learning model to predicting one class for one pixel. This is because a single region of an output image could benefit from using information from multiple different views depicted in input images.

After pretraining the second machine learning model to generate the visibility segment maps 608, the reposing module 110 trains the first machine learning model, the second machine learning model, and the third machine learning model end-to-end as described in greater detail below. Once the models have been trained end-to-end, the selection module 204 implements the second machine learning model to predict per-pixel soft attention over the first, second, and third input digital images 116, 120, 124 which is conditioned on the target pose represented by the keypoints 128. For instance, the selection module 204 implements the transformer 602 to capture inter-channel relationships between the first, second, and third input digital images 116, 120, 124 and the keypoints 118 for the first pose, the keypoints 122 for the second pose, and the keypoints 126 for the third pose using self-attention within shifting windows and cross-attention between shifting windows.

In an example, the transformer 602 encodes the captured inter-channel relationships in the multilayer embeddings 606. The selection module 204 implements the feature pyramid network 604 to decode the multilayer embeddings 606 by performing per-pixel segmentation. For example, the feature pyramid network 604 decodes the multilayer embeddings 606 by merging information from multiple different scales. Finally, the selection module 204 applies SoftMax on outputs from the feature pyramid network 604 to generate a first selection mask 130 $s^1$ for the first input digital image 116, a second selection mask 132 $s^2$ for the second input digital image 120, and a third-selection mask 134 $s^3$ for the third input digital image 124.

Figure 7:
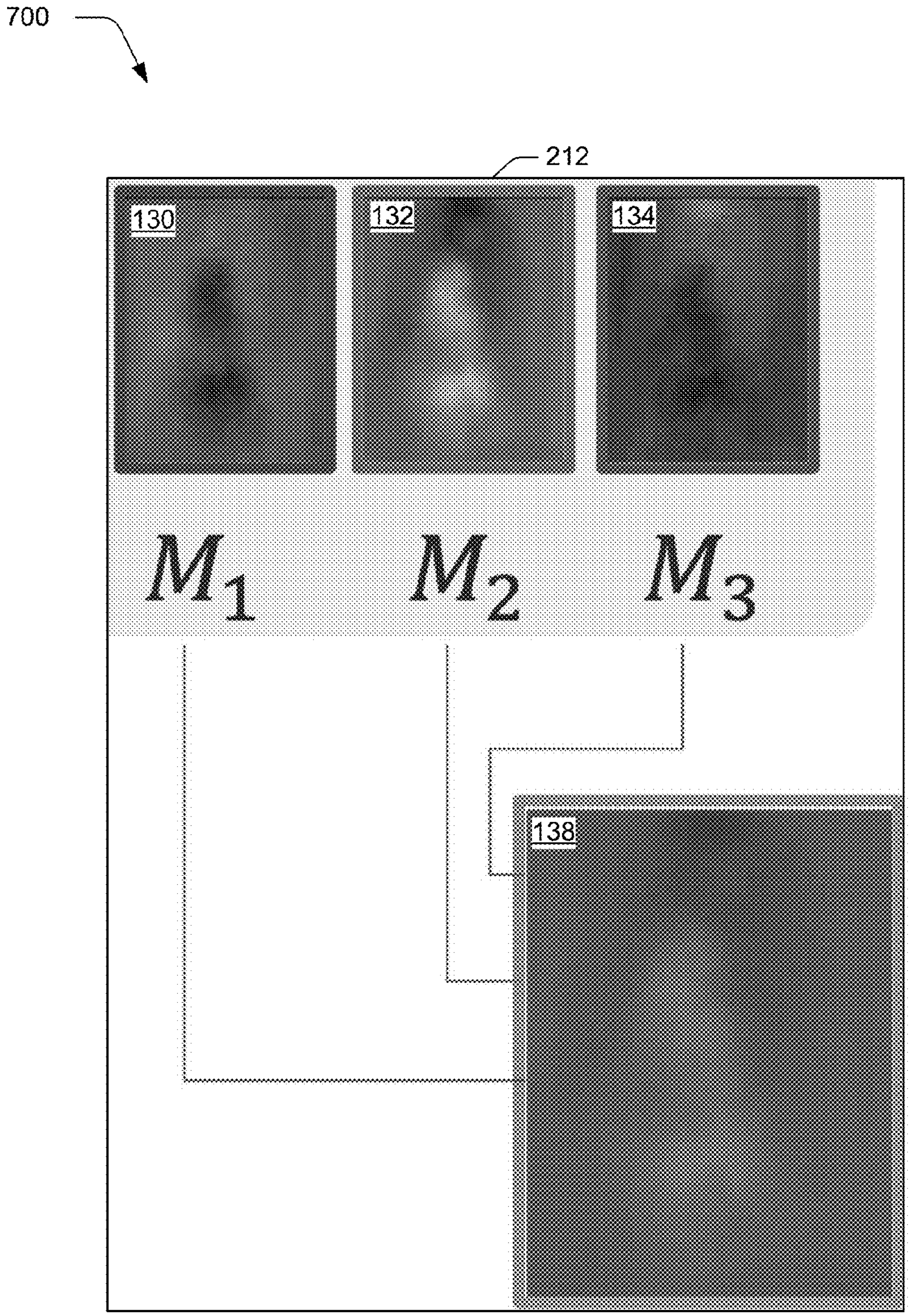
FIG. 7 illustrates a representation of selection data.

FIG. 7 illustrates a representation 700 of selection data 212. As shown in the representation 700, the selection module 204 generates the selection data 212 as describing the first, second, and third selection masks 130 $s^1$, 132 $s^2$, 134 $s^3$. The first, second, and third selection masks 130 $s^1$, 132 $s^2$, 134 $s^3$ are two-dimensional and represent likelihoods of spatial correspondence between output pixels and portions of the first, second, and third input digital images 116, 120, 124, respectively. In an example, when the first, second, and third selection masks 130, 132, 134 are combined, the combination forms a representation 138 which indicates the likelihoods of spatial correspondence using color channels. For example, the color red depicted in the representation 138 corresponds to portions of the first input digital image 116, the color green depicted in the representation 138 corresponds to portions of the second input digital image 120, and the color blue depicted in the representation 138 corresponds to portions of the third input digital image 124.

Figure 8:
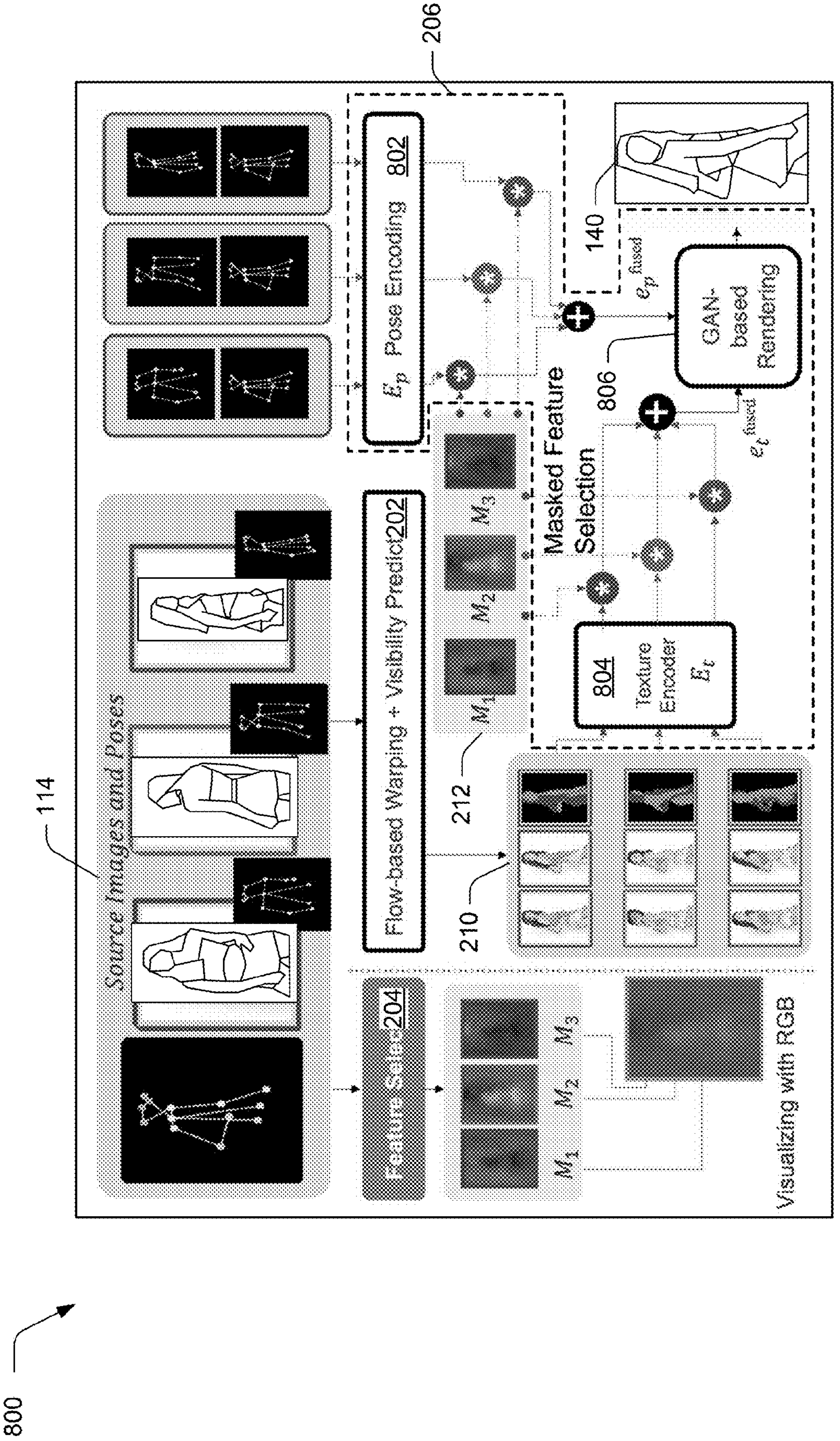
FIG. 8 illustrates a representation of a generator module.

FIG. 8 illustrates a representation 800 of a generator module 206. The generator model 206 receives the visibility data 210, the selection data 212, and the input data 114 as inputs, and the generator module 206 processes the visibility data 210, the selection data 212, and the input data 114 to generate reposed data 214. To do so in one example, the generator module 206 leverages the third machine learning model which is included in or accessible to the generator module 206.

In an example, the third machine learning model includes a pose encoder 802, a texture encoder 804, and a decoder 806. In this example, the generator module 206 implements the pose encoder 802 to process the keypoints 118 for the first pose, the keypoints 122 for the second pose, the keypoints 126 for the third pose, and the keypoints 128 for the target pose described by the input data 114. For example, the generator module 206 resizes the first, second, and third selection masks 130, 132, 134 to match spatial dimensions of texture features $$e_t^{1:3}$$

and pose features $$e_p^{1:3}$$

using bilinear interpolation. Once resized, the generator module 206 leverages the first, second, and third selection masks 130, 132, 134 to fuse the pose features $$e_p^{1:3}$$

in a feature space in order to generate fused pose features $$e_p^{fused}.$$

Consider an example in which the generator module 206 implements the texture encoder 804 to process the visibility segment maps 404, 502, 508; the first predicted images 412, 504, 510; and the second predicted images 414, 506, 512 described by the visibility data 210. As part of processing the visibility data 210, the generator module 206 leverages the first, second, and third selection masks 130 $s^1$, 132 $s^2$, 134 $s^3$ to fuse the texture features $$e_t^{1:3}$$

in a feature space in order to generate fused texture features $$e_t^{fused}.$$

Finally, generator module 206 processes the fused texture features $$e_t^{fused}$$

and the fused pose features $$e_p^{fused}$$

using the decoder 806 generate an output digital image 140. The generator module 206 generates the reposed data 214 as describing the output digital image 140 and the display module 208 receives and processes the reposed data 214 to render the output digital image 140 for display in a user interface such as the user interface 136. In an example, this is representable as:

$$I_w^{v,k}, I_w^{i,k}, V_t^k = W(I_s^k, P_s^k, P_t)$$
$$e_t^k = E_t(I_w^{v,k}, I_w^{i,k}, V_t^k)$$
$$e_p^k = E_p(P_s^k, P_t)$$
$$s^{1:3} = \text{Softmax}\left(S\left(\left[I_s^k\right]_{k=1:3}, \left[P_s^k\right]_{k=1:3}, P_t\right)\right)$$
$$e_t^{fused} = e_t^1 \cdot s^1 \oplus e_t^2 \cdot s^2 \oplus e_t^3 \cdot s^3$$
$$e_p^{fused} = e_p^1 \cdot s^1 + e_p^2 \cdot s^2 + e_p^3 \cdot s^3$$
$$I_p = D(e_t^{fused}, e_p^{fused})$$

where: $\oplus$ indicates that arithmetic addition happens at multiple scales (e.g., with feature pyramids) and not just with the end activation of the encoding process;

$$I_s^k$$

represents input digital images such as the first, second, and third input digital images 116, 120, 124;

$$P_s^k$$

represents keypoints for poses of a person depicted in input digital images such as the keypoints 118 for the first pose, the keypoints 122 for the second pose, and the keypoints 126 for the third pose; and $P_t$ represents keypoints for a target pose such as the keypoints 128 for the target pose.

As shown, the output digital image 140 realistically depicts the person in the target pose. The reposing module 110 trains the first machine learning model, the second machine learning model, and the third machine learning model end-to-end to minimize losses between the output digital image 140 and the ground truth output image 410. For example, reposing module 110 trains the machine learning models end-to-end to minimize a pixel-wise mean of absolute difference ($L_1$) for pattern and shape reproduction; VGG-features using a perceptual difference ($L_{vgg}$); and a style difference ($L_{sty}$) measured using Gram-matrices as described by Leon A. Gatys et al., *Image style transfer using convolutional neural networks*, In 2016 IEEE Conference on Computer Vision and Pattern Recognition, pages 2414-2423 (2016). For instance, the perceptual and styles losses preserve semantic features from input images such as an identity of the person and garment styles. The reposing module 110 also minimizes an adversarial loss (Lady) for output images. This loss is useful for rendering realistic outputs. In an example, a total loss is representable as:

$$L(I_p, I_{gt}) = \alpha_{rec}\|I_p, I_{gt}\|_1 + \alpha_{per}L_{vgg}(I_p, I_{gt}) + \alpha_{sty}L_{sty}(I_p, I_{gt}) + \alpha_{adv}L_{adv}(I_p, I_{gt})$$

where: $\alpha_{rec}$, $\alpha_{per}$, $\alpha_{sty}$, and $\alpha_{adv}$ are weights to combine the losses; $I_p$ represents the output digital image 140; and $I_{gt}$ represents the ground truth output image 410.

Figure 9:
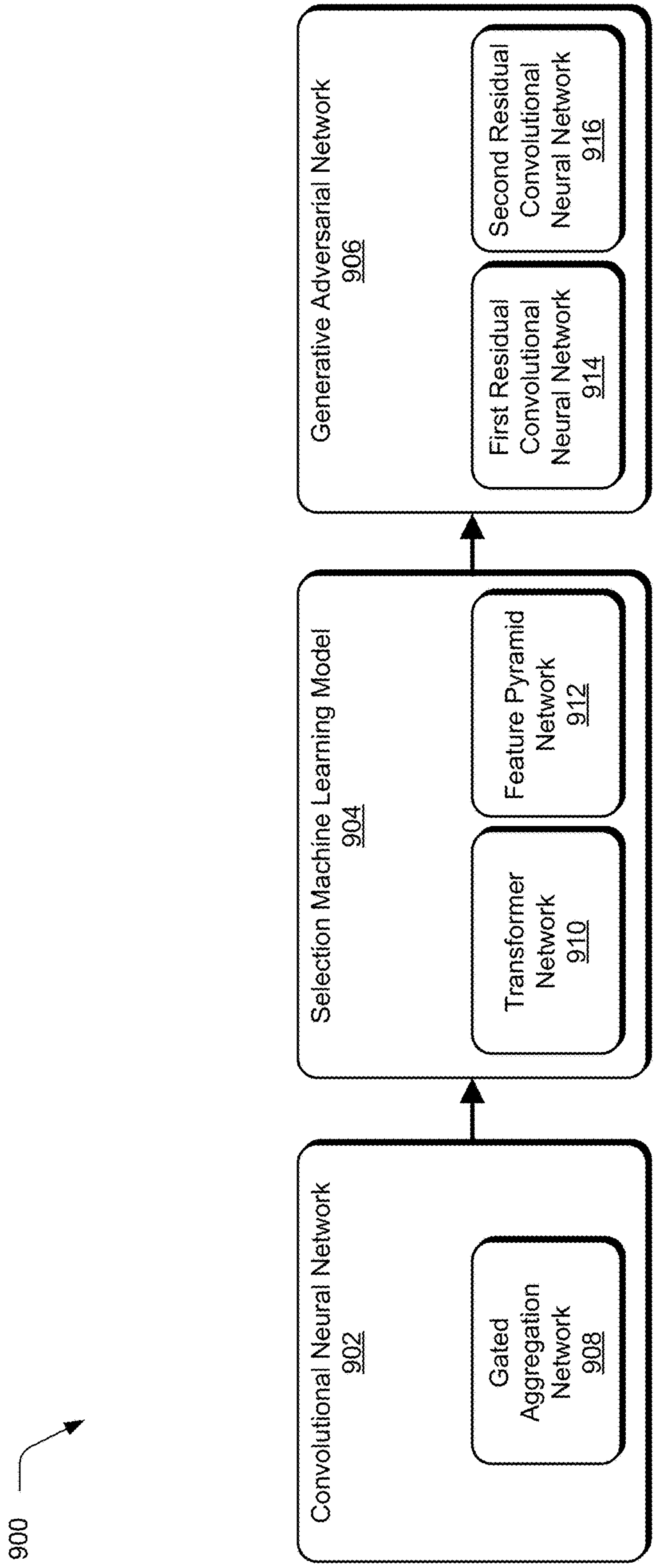
FIG. 9 illustrates a representation of a first machine learning model, a second machine learning model, and a third machine learning model.

FIG. 9 illustrates a representation 900 of a first machine learning model, a second machine learning model, and a third machine learning model. As shown, the representation includes a convolutional neural network 902, a selection machine learning model 904, and a generative adversarial network 906. In an example, the first machine learning model includes the convolutional neural network 902. In another example, the third machine learning model includes the generative adversarial network 906. In some examples, the second machine learning model includes the selection machine learning model 904.

For example, the convolutional neural network 902 includes a gated aggregation network 908. In this example, the gated aggregation network 908 is capable of performing the gated aggregation techniques described above. The selection machine learning model 904 is illustrated to include a transformer network 910 and a feature pyramid network 912. For instance, the generative adversarial network 906 includes a first residual convolutional neural network 914 and a second residual convolutional neural network 916.

FIG. 10 illustrates a representation 1000 of training a first machine learning model, a second machine learning model, and a third machine learning model. The first machine learning model corresponds to a convolutional neural network 902, the second machine learning model corresponds to a selection machine learning model 904, and a third machine learning model corresponds to a generative adversarial network 906. Training data is collected (at 1002). For example, the training data is configurable to include a training set of digital images. The training set of digital images includes annotations that are then used as a basis to train a machine learning model, e.g., using the annotation as labels. The annotations, for instance, include bounding boxes describing a location of an item of interest (e.g., an article of clothing), landmarks identifying points of interest on the article of clothing (e.g., corners, center, ends), type and category of the article of clothing, attribute labels (e.g., presence of attributes such as sleeves, fit), and so forth. An example of which includes a dataset as described by Liu et al., *Deepfashion: Powering robust clothes recognition and retrieval with rich annotations*, In the IEEE Conference on Computer Vision and Pattern Recognition (CVPR), 5 (June 2016). Relevant features are identified (at 1004), e.g., from the annotations. In an example, keypoints are extracted as described above. The second machine learning model is pretrained (at 1008). In one example, the second machine learning model is pretrained as described above that describe landmarks within a particular article of clothing, human model, and so forth.

The first machine learning model is trained on the training data (at 1010). For example, the first machine learning model is trained on the training data as described above. The second machine learning model is trained (1012). In an example, the pretrained second machine learning model is trained on the training data as described above. The third machine learning model is trained on the training data (at 1014). In some examples, the third machine learning model is trained on the training data as described above.

Training of the first, second, and third machine learning models is performable in a variety of ways. In one or more examples, loss functions are used to quantify "how well" predictions made by the machine learning model align with an expectation, e.g., a desired outcome.

Hyperparameters are set (at 1016). Hyperparameters, for instance, are set by a user to control a training process, e.g., learning rate, number of layers and neurons, batch size, number of epochs, to specify an activation function, regularization parameters, and so on. In one example, a learning rate of 3e-4 is set. The first machine learning model, the second machine learning model, and the third machine learning model are trained end-to-end on the training data (at 1018). A stopping criterion is met (at 1020). The stopping criterion is set based on a rule or heuristic to specify when the training process is to be stopped, e.g., to protect against overfitting. Examples of stopping criteria include a maximum number of epochs, a validation loss, based on learning rate, convergence, and so on. An output is generated based on subsequent data using the trained first machine learning model, the trained second machine learning model, and the trained third machine learning model (at 1022).

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-10. FIG. 11 is a flow diagram depicting a procedure 1100 in an example implementation in which an output image is generated depicting a person in a target pose based on input data.

Input data is received describing: input digital images; pluralities of keypoints corresponding to the input digital images, the pluralities of keypoints representing poses of a person depicted in the input digital images; and a plurality of keypoints representing a target pose (bock 1102). For example, the computing device 102 implements the reposing module 110 to receive the input data. Selection masks are generated corresponding to the input digital images by processing the input data using a machine learning model, the selection masks representing likelihoods of spatial correspondence between pixels of an output digital image and portions of the input digital images (block 1104). In an example, the reposing module 110 generates the selection masks using the machine learning model. The output digital image is generated depicting the person in the target pose for display in a user interface based on the selection masks and the input data (block 1106). In some examples, the reposing module 110 generates the output digital image.

FIG. 12 is a flow diagram depicting a procedure 1200 in an example implementation in which two-dimensional selection masks are generated based on input data. Input data is received describing: input digital images; pluralities of keypoints corresponding to the input digital images, the pluralities of keypoints representing poses of a person depicted in the input digital images; and a plurality of keypoints representing a target pose (bock 1202). In one example, the computing device 102 implements the reposing module 110 to receive the input data. Two-dimensional selection masks are generated by processing the input data using a machine learning model, each of the two-dimensional selection masks indicating likelihoods of spatial correspondence between positions of an input digital image and output pixels of an output digital image depicting the person in the target pose (block 1204). For example, the reposing module 110 generates the two-dimensional selection masks. The output digital image is generated for display in a user interface based on the two-dimensional selection masks and the input data (block 1206). In an example, the reposing module 110 generates the output digital image.

Example System and Device

Figure 13:
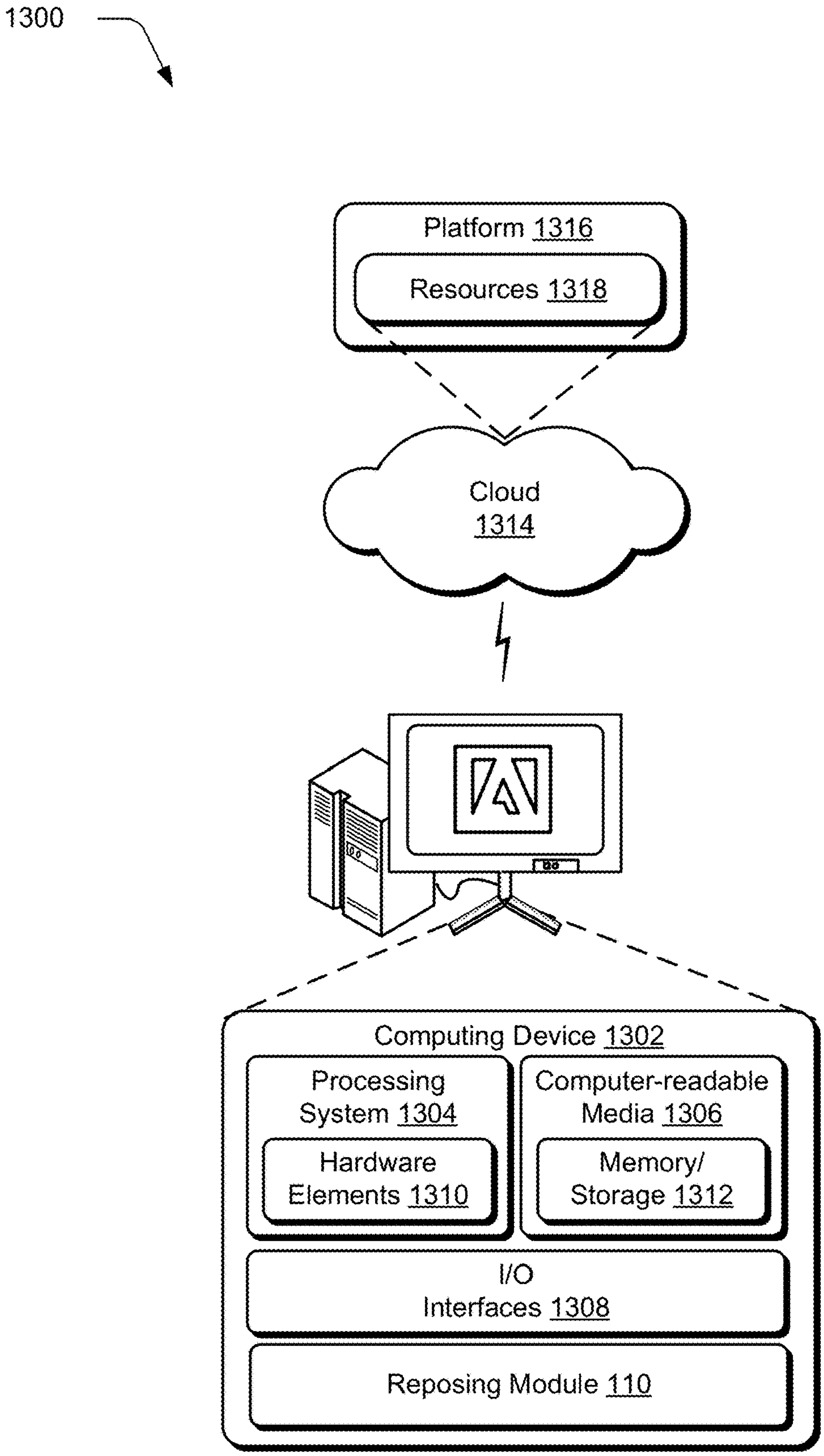
FIG. 13 illustrates an example system that includes an example computing device that is representative of one or more computing systems and/or devices for implementing the various techniques described herein.

FIG. 13 illustrates an example system 1300 that includes an example computing device that is representative of one or more computing systems and/or devices that are usable to implement the various techniques described herein. This is illustrated through inclusion of the reposing module 110. The computing device 1302 includes, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that are configured as processors, functional blocks, and so forth. This includes example implementations in hardware as an application specific integrated circuit or other logic device formed using one or more semiconductors. The hardware elements 1310 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1306 is illustrated as including memory/storage 1312. The memory/storage 1312 represents memory/storage capacity associated with one or more computer-readable media. In one example, the memory/storage 1312 includes volatile media (such as random access memory (RAM)) and/or nonvolatile media (such as read only memory (ROM), Flash memory, optical disks, magnetic disks, and so forth). In another example, the memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1302. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1310. For example, the computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing system 1304. The instructions and/or functions are executable/operable by one or more articles of manufacture (for example, one or more computing devices 1302 and/or processing systems 1304) to implement techniques, modules, and examples described herein.

The techniques described herein are supportable by various configurations of the computing device 1302 and are not limited to the specific examples of the techniques described herein. This functionality is also implementable entirely or partially through use of a distributed system, such as over a "cloud" 1314 as described below.

The cloud 1314 includes and/or is representative of a platform 1316 for resources 1318. The platform 1316 abstracts underlying functionality of hardware (e.g., servers) and software resources of the cloud 1314. For example, the resources 1318 include applications and/or data that are utilized while computer processing is executed on servers that are remote from the computing device 1302. In some examples, the resources 1318 also include services provided over the Internet and/or through a subscriber network, such as a cellular or Wi-Fi network.

The platform 1316 abstracts the resources 1318 and functions to connect the computing device 1302 with other computing devices. In some examples, the platform 1316 also serves to abstract scaling of resources to provide a corresponding level of scale to encountered demand for the resources that are implemented via the platform. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

What is claimed is:

1. A method comprising:

receiving, by a processor, input data describing:

input digital images;

pluralities of keypoints corresponding to the input digital images, the pluralities of keypoints representing poses of a person depicted in the input digital images; and a plurality of keypoints representing a target pose;

generating, by the processor, selection masks corresponding to the input digital images by processing the input data using a machine learning model, the selection masks representing likelihoods of spatial correspondence between pixels of an output digital image and portions of the input digital images;

generating, by the processor, a first predicted image and a second predicted image for each of the input digital images using an additional machine learning model trained on training data to generate predicted images, each first predicted image generated based on first pluralities of portions of the person in the target pose that are visible in a corresponding input digital image and each second predicted image generated based on second pluralities of portions of the person in the target pose that are invisible in a corresponding input digital image; and generating, by the processor, the output digital image depicting the person in the target pose for display in a user interface based on the selection masks, the first predicted image, the second predicted image, and the input data.

2. The method as described in claim 1, further comprising generating a visibility segment map for each of the input digital images using an additional machine learning model trained on training data to generate visibility segmentation maps, each visibility segmentation map indicating first pluralities of portions of the person in the target pose that are visible in a corresponding input digital image and second pluralities of portions of the person in the target pose that are invisible in the corresponding input digital image.

3. The method as described in claim 1, wherein the machine learning model includes a transformer and a feature pyramid network trained on training data to generate the selection masks.

4. The method as described in claim 1, wherein the selection masks are used for fusing texture features and pose features in a feature space.

5. The method as described in claim 1, wherein the selection masks are generated using self-attention within shifting windows and cross-attention between sets of the shifting windows.

6. The method as described in claim 1, wherein the output digital image is generated using an additional machine learning model trained on training data to generate output digital images.

7. The method as described in claim 1, wherein the output digital image is generated based on pose encodings that represent the pluralities of keypoints representing the poses of the person depicted in the input digital images and the plurality of keypoints representing the target pose.

8. The method as described in claim 1, wherein the output digital image is generated based on texture encodings that represent visibility segment maps indicating first pluralities of portions of the person in the target pose that are visible in a corresponding input digital image and second pluralities of portions of the person in the target pose that are invisible in a corresponding input digital image.

9. The method as described in claim 1, wherein the machine learning model is pretrained on additional training data to generate visibility segment maps indicating first pluralities of portions of a particular person in a particular target pose that are visible in a training digital image depicting the particular person and second pluralities of portions of the particular person in the particular target pose that are invisible in the training digital image.

10. A system comprising:

a memory component; and a processor coupled to the memory component, the processor to perform operations comprising:

receiving input data describing:

input digital images;

pluralities of keypoints corresponding to the input digital images, the pluralities of keypoints representing poses of a person depicted in the input digital images; and a plurality of keypoints representing a target pose;

generating two-dimensional selection masks by processing the input data using a machine learning model, each of the two-dimensional selection masks indicating likelihoods of spatial correspondence between positions of an input digital image and output pixels of an output digital image depicting the person in the target pose;

generating a first predicted image and a second predicted image for each of the input digital images using an additional machine learning model trained on training data to generate predicted images, each first predicted image generated based on first pluralities of portions of the person in the target pose that are visible in a corresponding input digital image and each second predicted image generated based on second pluralities of portions of the person in the target pose that are invisible in a corresponding input digital image; and generating the output digital image for display in a user interface based on the two-dimensional selection masks, the first predicted image, the second predicted image, and the input data.

11. The system as described in claim 10, wherein the machine learning model includes a transformer and a feature pyramid network trained on training data to generate the two-dimensional selection masks.

12. The system as described in claim 10, wherein the two-dimensional selection masks are used for fusing texture features and pose features in a feature space.

13. The system as described in claim 10, wherein the two-dimensional selection masks are generated using self-attention within shifting windows and cross-attention between sets of the shifting windows.

14. The system as described in claim 10, wherein the machine learning model is pretrained on additional training data to generate visibility segment maps indicating first pluralities of portions of a particular person in a particular target pose that are visible in a training digital image depicting the particular person in a particular source pose and second pluralities of portions of the particular person in the particular target pose that are invisible in the training digital image.

15. One or more non-transitory computer-readable storage media storing instructions that, responsive to execution by a processor, causes a processor to perform operations comprising:

receiving input data describing:

input digital images;

pluralities of keypoints corresponding to the input digital images, the pluralities of keypoints representing poses of a person depicted in the input digital images; and a plurality of keypoints representing a target pose;

generating selection masks corresponding to the input digital images by processing the input data using a machine learning model, the selection masks representing likelihoods of spatial correspondence between pixels of an output digital image and portions of the input digital images;

generating a first predicted image and a second predicted image for each of the input digital images using an additional machine learning model trained on training data to generate predicted images, each first predicted image generated based on first pluralities of portions of the person in the target pose that are visible in a corresponding input digital image and each second predicted image generated based on second pluralities of portions of the person in the target pose that are invisible in a corresponding input digital image; and generating the output digital image depicting the person in the target pose for display in a user interface based on the selection masks, the first predicted image, the second predicted image, and the input data.

16. The one or more non-transitory computer-readable storage media as described in claim 15, further comprising generating a visibility segment map for each of the input digital images using an additional machine learning model trained on training data to generate visibility segmentation maps, each visibility segmentation map indicating first pluralities of portions of the person in the target pose that are visible in a corresponding input digital image and second pluralities of portions of the person in the target pose that are invisible in the corresponding input digital image.

17. The one or more non-transitory computer-readable storage media as described in claim 15, wherein the machine learning model includes a transformer and a feature pyramid network trained on training data to generate the selection masks.

18. The one or more non-transitory computer-readable storage media as described in claim 15, wherein the selection masks are used for fusing texture features and pose features in a feature space.

19. The one or more non-transitory computer-readable storage media as described in claim 15, wherein the selection masks are generated using self-attention within shifting windows and cross-attention between sets of the shifting windows.

* * * * *